United States Patent
O'Grady et al.

(10) Patent No.: US 11,638,133 B1
(45) Date of Patent: Apr. 25, 2023

(54) DISTRIBUTED PROCESSING SYSTEM FOR VEHICLES

(71) Applicant: Rivian IP Holdings, LLC, Irvine, CA (US)

(72) Inventors: Jack O'Grady, Venice, CA (US); Paul McLachlan, Bellevue, WA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/742,571

(22) Filed: May 12, 2022

(51) Int. Cl.
 H04W 4/46 (2018.01)
 H04L 67/10 (2022.01)
 H04W 24/08 (2009.01)

(52) U.S. Cl.
 CPC .............. *H04W 4/46* (2018.02); *H04L 67/10* (2013.01); *H04W 24/08* (2013.01)

(58) Field of Classification Search
 CPC .......... H04W 4/46; H04W 24/08; H04L 67/10
 See application file for complete search history.

(56) References Cited

U.S. PATENT DOCUMENTS

2018/0300964 A1* 10/2018 Lakshamanan ........ G06N 20/10
2021/0406065 A1* 12/2021 Liu ....................... G06K 9/6262

FOREIGN PATENT DOCUMENTS

CN        113535261 B   *  9/2022
KR        20220071583 A  * 11/2020

* cited by examiner

Primary Examiner — Cheikh T Ndiaye
(74) Attorney, Agent, or Firm — Foley & Lardner LLP

(57) ABSTRACT

Disclosed are systems and methods for distributing an operation across vehicles. A data processing system including one or more processors, coupled to memory can identify an operation executable by the data processing system. The data processing system can calculate a duration of a communication channel between the vehicle and a second vehicle and determine that the duration of the communication channel is greater than or equal to a threshold. The data processing system can determine, responsive to the determination that the duration of the communication channel is greater than or equal to the threshold, to split the operation into a first and second process for distributed processing by the vehicle and the second vehicle. The data processing system can transmit, responsive to the determination to split the operation, a request to perform the second process to the second vehicle to cause the second vehicle to execute the second process.

20 Claims, 8 Drawing Sheets

DISTRIBUTED PROCESSING SYSTEM FOR VEHICLES

INTRODUCTION

A vehicle can include a processor and a display device. The processor of the vehicle can receive input, and generate output for presentation via a display device of the vehicle.

SUMMARY

This technical solution is directed to distributing processing among different vehicles. For example, a vehicle may offload computing tasks to a remote computing system via a radio area network (RAN). However, RAN connectivity may not always be available to the vehicle. Systems, methods and apparatus of this technical solution can reduce energy consumption, processing, or processing latency by splitting a process into a first process for execution by a first vehicle and a second process for execution by a second vehicle and transmitting the second process to the second vehicle. A vehicle, such as an electric vehicle, can generate and distribute messages to other vehicles. The messages can include data that indicates how long two vehicles will be in a line-of-sight with each other. This data can, in some cases, include a direction (e.g., heading), a speed, an altitude, a planned vehicle route, a travel destination, a vehicle location. The messages can include data that indicates available computational resources of the electric vehicles. A first electric vehicle can receive a message from at least one second electric vehicle, or multiple messages from multiple vehicles, and determine whether a particular resource intensive operation of the first vehicle should be distributed to the second electric vehicle. The first electric vehicle can perform computations that determine, for example, how long the first electric vehicle and the second electric vehicle will be in a line of sight, whether the other vehicles have enough computing resources to perform a computing task while the vehicles are in the light of sight, or whether the other vehicles are eligible. Responsive to determining to distribute an operation between the first electric vehicle and the second electric vehicle, the first electric vehicle can communicate with the second electric vehicle causing the operation to be split into two separate processes, a first process to be performed by the first vehicle and a second process to be performed by the second vehicle. The vehicles can communicate with each other via direct inter-vehicle communication techniques to distribute computationally resource intensive operations. The vehicles can distribute computationally resource intensive operations when access to external computing via a RAN is unavailable.

At least one aspect is directed to a system. The system can include a data processing system including one or more processors, coupled to memory. The data processing system can identify an operation executable by the data processing system. The data processing system can calculate a duration of a communication channel between the vehicle and a second vehicle and determine that the duration of the communication channel is greater than or equal to a threshold. The data processing system can determine, responsive to the determination that the duration of the communication channel is greater than or equal to the threshold, to split the operation into a first process and a second process for distributed processing by the vehicle and the second vehicle. The data processing system can transmit, responsive to the determination to split the operation, a request to perform the second process to the second vehicle to cause the second vehicle to execute the second process.

At least one aspect is directed to a method. The method can include identifying, by a data processing system including one or more processors, coupled to memory, an operation executable by the processing circuit. The method can include calculating, by the data processing system, a duration of a communication channel between the vehicle and a second vehicle and determining, by the data processing system, that the duration of the communication channel is greater than or equal to a threshold. The method can include determining, by the data processing system, responsive to determining that the duration of the communication channel is greater than or equal to the threshold, to split the operation into a first process and a second process for distributed processing by the vehicle and the second vehicle. The method can include transmitting, by the data processing system, responsive to the determination to split the operation, a request to perform the second process to the second vehicle to cause the second vehicle to execute the second process.

At least one aspect is directed to a system. The system can include a data processing system comprising one or more processors, coupled to memory. The data processing system can generate a message comprising data indicating a duration of a communication channel between the vehicle and a second vehicle. The data processing system can transmit the message to the second vehicle. The data processing system can receive a request from the second vehicle to perform a process. The second vehicle can compare the duration to a threshold to determine to send the request to the vehicle. The data processing system can generate result data by performing the process. The data processing system can transmit the result data to the second vehicle.

At least one aspect is directed to a vehicle. The vehicle can include a data processing system comprising one or more processors, coupled to memory. The data processing system can identify an operation executable by the data processing system. The data processing system can calculate a duration of a communication channel between the vehicle and a second vehicle and determine that the duration of the communication channel is greater than or equal to a threshold. The data processing system can determine, responsive to the determination that the duration of the communication channel is greater than or equal to the threshold, to split the operation into a first process and a second process for distributed processing by the vehicle and the second vehicle. The data processing system can transmit, responsive to the determination to split the operation, a request to perform the second process to the second vehicle to cause the second vehicle to execute the second process.

At least one aspect is directed to a vehicle. The vehicle can include a data processing system comprising one or more processors, coupled to memory. The data processing system can generate a message comprising data indicating a duration of a communication channel between the vehicle and a second vehicle. The data processing system can transmit the message to the second vehicle. The data processing system can receive a request from the second vehicle to perform a process, the second vehicle compares the duration to a threshold to determine to send the request to the vehicle. The data processing system can generate result data by performing the process. The data processing system can transmit the result data to the second vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
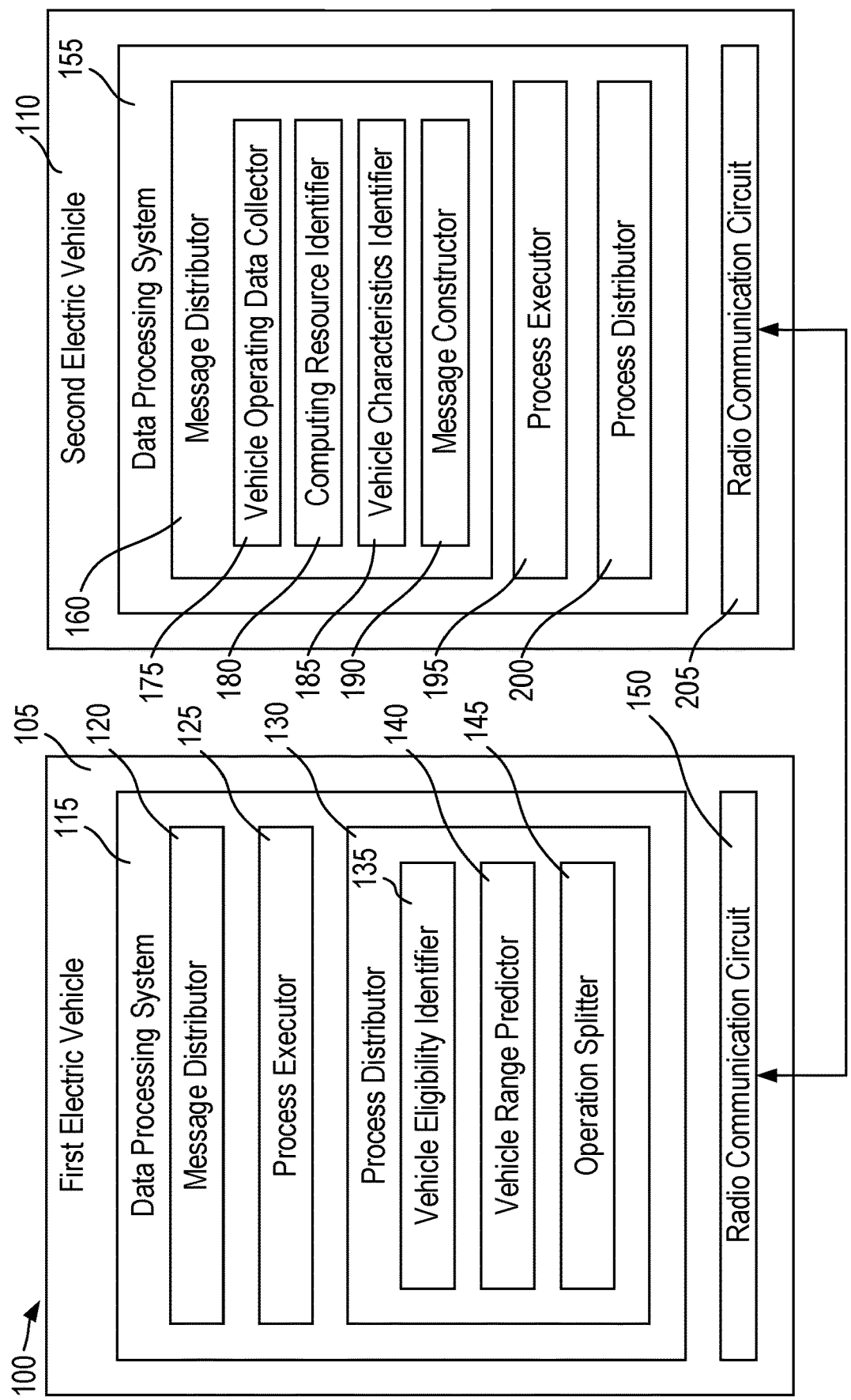
FIG. 1 is a block diagram of first electric vehicle and a second electric vehicle that distribute processes.

Following below are more detailed descriptions of various concepts related to, and implementations of, methods, apparatuses, and systems of distributing operations across vehicles such as electric vehicles. The various concepts introduced above and discussed in greater detail below may be implemented in any of numerous ways.

This disclosure is generally directed to systems and methods for distributing computational resources across electric vehicles. Computationally intensive operations for an electric vehicle, such as driver-assistance system operations, can be performed at least in part on a remote computing system, e.g., by a cloud platform. The electric vehicle can communicate, via a radio of the electric vehicle, with a radio access network (RAN) that connects the electric vehicle with the remote computing system. A radio can include one or multiple antenna or circuits that perform bidirectional or directional communications with another system. However, the electric vehicle may not have access to the RAN in some circumstances and therefore may be unable to have the remote computing system perform the computationally intensive operations for the vehicle. For example, RAN access may be unavailable when the vehicle is in a remote geographic area, in a parking structure, underground, at a job site, operating off road. Further, performing the computation locally on the vehicle may result in excessive utilization of the computational resources of the vehicle, battery resources of the vehicle, or introduce latency or delays into a computational pipeline. To address these example technical problems, the systems and methods of this technical solution can utilize a communication protocol that provides direct communication between vehicles. The direct communication may not require a cellular network. An example communication protocol for direct communication between vehicles or distributing operations across multiple vehicles can include Sidelink. Sidelink allows for vehicle to everything (V2X) communication and vehicle to vehicle (V2V) communication. These techniques can provide direct inter-vehicle communication even when access to a RAN is unavailable. Sidelink communication can use a line-of-sight communication channel between vehicles.

Vehicles such as electric vehicles can generate and distribute messages to each other. These messages can be generated and distributed based on a time interval, periodically, responsive to a request, or in a continuous manner. The message can be, or included in, a data packet. The data packet can be indexed with a header. The data packet can include a body. The header can include, for example, an identifier of the data packet, an identifier of the vehicle that generates the data packet, or a timestamp. The body of the data packet can include data that indicates a duration of a communication channel between vehicles. This data can, in some cases, include a direction (e.g., heading), a speed, a planned vehicle route, a travel destination, or a vehicle location. The messages can include data that indicates available computational resources of the electric vehicles. The messages can include data such as identifiers, timestamps, computing hardware identifiers, or a spatial map. A first electric vehicle can receive a message from a second electric vehicle, or multiple messages from multiple vehicles, and determine whether a particular resource intensive operation of the first vehicle should be distributed to the at least one second electric vehicle or any other vehicles. The first electric vehicle can perform computations that determine, for example, how long the first electric vehicle and the at least one second electric vehicle will be in a line-of-sight, whether the other vehicles have enough computing resources to perform a computing task while the vehicles are in the light of sight, or whether the other vehicles are eligible. Responsive to determining to distribute an operation between the first electric vehicle and the at least one second electric vehicle, the first electric vehicle can communicate with the at least one second electric vehicle causing the operation to be split into two separate processes, a first process performed by the first vehicle and a second process performed by the second vehicle.

FIG. 1 is a block diagram of a system 100 for distributed processing among vehicles. The system 100 can include, interface with, or otherwise access a first vehicle such as a first electric vehicle 105. The system 100 can include, interface with, or otherwise access a second vehicle such as a second electric vehicle 110. The first electric vehicle 105 can include a data processing system 115. The second electric vehicle 110 can include a data processing system 155. The data processing system 115 and the data processing system 155 can be the same or similar type of data processing system. For example, the data processing system 155 can include one or more component or functionality of data processing system 115. The data processing system 115 can be an on-board computing system of the first electric vehicle 105. The data processing system 115 can include multiple pieces of hardware that execute operations of the first electric vehicle 105. The data processing system 115 can include one or multiple central processing units (CPUs) or graphics processing units (GPUs) that execute operations for the first electric vehicle 105. The data processing system 115 can include multiple memory devices that store data of the first electric vehicle 105. The memory devices can include hard drives, random access memory (RAM), read only memory (ROM), or various other types of memory storage. The data processing system 115 can include or use one or more component or functionality depicted in in FIG. 8.

The first electric vehicle 105 can include a radio communication circuit 150. The second electric vehicle 110 can include a radio communication circuit 205. The radio communication circuit 150 and the radio communication circuit 205 can be the same or a similar type of radio communication circuit. The radio communication circuit 150 can implement wireless communication with other systems or devices. The wireless communication can include wirelessly transmitting data to another device. The communication can include wirelessly receiving data from the other device. The radio communication circuit 150 can include one or multiple circuits that implement radio communication with a RAN or with the second electric vehicle 110. The radio communication circuit 150 can include antennas, receivers, transmitters, transceivers, filters, amplifiers, digital signal processing units, modulators, front end modules, or other hardware to implement signal processing for radio communication. The radio communication circuit 150 can implement cellular communication with a cellular network (e.g., a RAN). The radio communication circuit 150 can implement Wi-Fi communication with a Wi-Fi network. The radio communication circuit 150 can implement Bluetooth communication with Bluetooth devices. The radio communication circuit 150 can implement communication over a local area network (LAN), a wide area network (WAN), or a metropolitan area network (MAN). The radio communication circuit 150 can connect the first electric vehicle 105 to the Internet via communication with one or more networks. The radio communication circuit 150 can implement device-to-device or ad-hoc communication with the second electric vehicle 110. The radio communication circuit 150 can implement an inter-vehicle communication protocol to communicate directly with the second electric vehicle 110 without communicating over with a cellular tower or RAN. The inter-vehicle communication protocol can be a peer-to-peer communication protocol. The inter-vehicle communication protocol can include Sidelink or another communication protocol that performs direct vehicle to vehicle communication. The radio communication circuit 150 can communicate with the radio communication circuit 205 of the second electric vehicle 110.

The radio communication circuit 150 can implement 5G New Radio (NR). The radio communication circuit 150 can communicate via 5G protocols with cellular networks or with the second electric vehicle 110. The radio communication circuit 150 can communicate over 3G, 4G Long Term Evolution (LTE), 5G, or 6G communication networks. The radio communication circuit 150 can communicate over any type of standards compliant communication network, e.g., a 3rd Generation Partnership Project (3GPP) network. The radio communication circuit 150 can implement Sidelink protocols. The radio communication circuit 150 can implement Sidelink to communicate with other devices over a particular range (e.g., a predefined line-of-sight range) via 5G NR. The Sidelink protocol can provide low latency communication with high bandwidth. The first electric vehicle 105 can transmit large files to the second electric vehicle 110 or receive large files from the second electric vehicle 110 via Sidelink. A large file may be a file that is greater than 10 megabyte (MB). A large file may be a file that is greater than 110 MB. A large file may be a file that is greater than 1 gigabyte (GB). The first electric vehicle 105 and the second electric vehicle 110 can self-form a network via Sidelink. Via Sidelink, the first electric vehicle 105 and the second electric vehicle 110 can self-form a network without connection to a RAN.

Sidelink can include vehicle-to-everything (V2X) communication. V2X communication can include vehicle-to-network (V2N) communication. The radio communication circuit 150 can communicate with a network via V2N, e.g., a RAN. V2X can include vehicle-to-vehicle (V2V) communication. The radio communication circuit 150 can communicate with the second electric vehicle 110 via V2V. V2X can include vehicle-to-infrastructure (V2I) communication. The radio communication circuit 150 can communicate with traffic infrastructure (e.g., traffic light systems, smart traffic signs, navigation systems) via V2I. V2X can include vehicle-to-pedestrian (V2P) communication. The radio communication circuit 150 can communicate with pedestrian systems (e.g., a smartphone of pedestrians on a sidewalk, road worker systems, smartphones of road workers) via V2P.

The data processing system 115 can include a message distributor 120. The data processing system 155 can include a message distributor 160. The message distributor 120 and the message distributor 160 can be the same instance of a software module or instances of similar software modules. The message distributor 160 can generate a message. The message distributor 160 can cause the radio communication circuit 205 to transmit the message to the radio communication circuit 150 of the first electric vehicle 105. The message can indicate a duration of a communication channel between the second electric vehicle 110 and the first electric vehicle 105. The message can indicate data that can be used by the first electric vehicle 105 to determine, calculate, or predict the duration of the communication channel. The duration of the communication channel can be a duration of a direct inter vehicle communication channel between the second electric vehicle 110 and the first electric vehicle 105. The duration can be a duration of a line-of-sight communication channel between the second electric vehicle 110 and the first electric vehicle 105.

The message distributor 160 can include a vehicle operating data collector 175. The vehicle operating data collector 175 can collect operating data of the second electric vehicle 110. The message distributor 160 can include a message constructor 190. The message constructor 190 can generate a message. The message constructor 190 can cause the message to include the operating data collected by the vehicle operating data collector 175. The vehicle operating data collector 175 can cause the message to include the operating data of the second electric vehicle 110. The vehicle operating data collector 175 can collect the operating data of the second electric vehicle 110 from one or more driving systems (e.g., a digital or mechanical odometer, a global positioning system, a navigation system, a compass, an autonomous driving system, an altimeter, or a vehicle control system) of the second electric vehicle 110. The vehicle operating data collector 175 can collect the operating data via watchdog signals of the data processing system 155. A watchdog signal may be a signal of a digital timer. The digital timer can run to detect data of a computing system, e.g., data values or errors, The operating data can indicate a driving direction of the second electric vehicle 110 (e.g., a heading of the second electric vehicle 110). The driving direction can be in units of degrees or an indication of North, South, East, West, North West, North East, South West, or South East. The operating data can indicate a speed at which the vehicle is traveling. The operating data can indicate a speed of the second electric vehicle 110. The speed can be in units of miles per hour (MPH) or kilometers per hour (KPH). The operating data can indicate an altitude of the second electric vehicle 110. The altitude can be in units of miles above sea level, feet above sea level, kilometers above sea level, meters above sea level. The operating data can indicate a road that the second electric vehicle 110 is traveling on, e.g., a name or identifier of the road. The operating data can indicate a planned destination that the second electric vehicle 110 is driving to. The operating data can indicate a planned travel route that the second electric vehicle 110 is traveling on, e.g., an address. The operating data can indicate a current location of the second electric vehicle 110, e.g., a latitude and longitude coordinate. The operating data can indicate a predicted location of the second electric vehicle 110, e.g., a latitude or longitude coordinate that the second electric vehicle 110 will be located at a particular time into the future based on a current location of the second electric vehicle 110, a speed of the second electric vehicle 110, and a direction of travel of the second electric vehicle 110. The operating data can indicate that the vehicle is parked or otherwise stationary.

The message distributor 160 can include a computing resource identifier 180. The computing resource identifier 180 can identify an available amount of computational resources of the second electric vehicle 110 to execute a process for distributed processing. The message constructor 190 can cause the message to include the available amount of computational resources. The identifier 180 can identify an available amount of computational resources of the second electric vehicle 110. The computing resource identifier 180 can monitor the data processing system 155 and determine a level of processing resources and a level of memory resources that are being consumed by on-board applications or processes of the second electric vehicle 110. The computing resource identifier 180 can identify an available level of processing resources based on a specification indicating the total level of processing resources available for a piece of processing hardware and the level of processing resources currently being consumed. The computing resource identifier 180 can identify an available level of memory resources based on a specification indicating the total level of memory resources available for a piece of memory hardware and the level of memory resources currently being consumed.

The message distributor 160 can include a vehicle characteristics identifier 185. The vehicle characteristics identifier 185 can identify characteristics of the second electric vehicle 110. The message constructor 190 can cause the message to include an indication of the characteristics of the second electric vehicle 110 identified by the identifier 185. The identifier 185 can retrieve indications of characteristics of the second electric vehicle 110 from one or more storage devices of the data processing system 155. The characteristics can include an identifier of the second electric vehicle 110. The identifier can uniquely identify the second electric vehicle 110. The identifier can be or include a cryptographic identifier. For example, the cryptographic identifier can be or include a digital signature. The characteristics can be a description of computational hardware of the data processing system 155. The description can indicate product or model identifiers of processors, memory devices, or storage devices of the data processing system 155. The description can indicate a type of the processors, memory devices, and storage devices. The type can be indicating that a particular processor is a CPU or a GPU. The type can indicate that a memory device is Static Random Access Memory (RAM) (SRAM) Dynamic RAM (DRAM) or Synchronous Dynamic RAM (SDRAM).

The message constructor 190 can cause the message to include a timestamp. The message constructor 190 can generate a message with the timestamp, or update a message to include the timestamp. The timestamp can indicate a time that the message was created. The timestamp can indicate a time that the message is transmitted by the radio communication circuit 205 to the radio communication circuit 150. The message constructor 190 can cause the message to indicate an availability time period. The availability time period can indicate a length of time into the future that the second electric vehicle 110 is available to perform distributed processing with the first electric vehicle 105. The message distributor 160 can cause the message to be transmitted to the first electric vehicle 105 by the radio communication circuit 205. The message distributor 160 can cause the message to be generated or transmitted periodically. The message distributor 160 can generate or transmit the message responsive to detecting the presence of the first electric vehicle 105. The message distributor 160 can generate or transmit the message responsive to receiving data from the radio communication circuit 150 of the first electric vehicle 105 including a request for the message or including an indication that the first electric vehicle 105 is available to perform distributed processing.

The message constructor 190 can cause the message to include spatial map data generated by the process executor 195. The spatial map data can be a current spatial map generated by the process executor 195 that the second electric vehicle 110 is operating on. The message constructor 190 can cause the message to include a current spatial map generated by the process executor 195. Each of the process executor 125 and the process executor 195 can execute a simultaneous localization and mapping algorithm (SLAM) to generate a spatial map. The spatial map can be generated in real-time. The spatial map can be overlaid with semantic information. The semantic information can be based on data gathered via sensors of the electric vehicles 105 and 110. The spatial map can include a three dimensional (or two dimensional) representation of an environment that a vehicle (e.g., the first electric vehicle 105 or the second electric vehicle 110) is located in. The spatial map can include on-road data, e.g., buildings, roads, signs, pedestrians, other vehicles, bicycles, motorcycles. The spatial map can include off-road data, e.g., trees, rocks, mountains, hills, animals. The spatial map can track objects as they move through an environment, e.g., as other vehicles, as pedestrians, as cyclists, or animals move through the environment.

Applying a full SLAM algorithm to a point cloud for a single scene can be computationally intensive (e.g., consume or utilize greater than 40%, 50%, 60%, 70%, 80% or more of the computational or memory capacity of a data processing system 115). The SLAM can be applied to a point cloud data gathered by sensors of the electric vehicles 105 and 110 respectively to generate the respective spatial map for each vehicle. Each of the process executor 125 and the process executor 195 can run applications on the spatial maps of the electric vehicles 105 and 110 respectively. The applications can be driver-assistance system (ADAS) tasks. ADAS tasks can include collision avoidance, adaptive cruise control, vehicle speed suggestions, emergency braking actions, autonomous parking, assisted parking, autonomous driving, or assisted driving.

The process distributor 130 of the first electric vehicle 105 can analyze the current spatial map of the second electric vehicle 110 to identify a level of overlap between a spatial map generated by the process executor 125 of the second electric vehicle 110 and the process executor 195 of the second electric vehicle 110. An overlap that meets a threshold can indicate that portions of the spatial map generated by the process executor 195 can be used to build the spatial map generated by the process executor 125. Responsive to the overlap meeting the threshold, the operation splitter 145 of the first electric vehicle 105 can determine to split execution of an operation that generates the spatial map of the first electric vehicle 105 into a first process executed by the process executor 125 to generate a first portion of the spatial map and a second process executed by the process executor 195 to generate a second portion of the spatial map. The radio communication circuit 205 can transmit the second portion of the spatial map to the radio communication circuit 150 of the first electric vehicle 105. The process executor 125 can receive the second portion of the spatial map from the radio communication circuit 150. The process executor 125 can join the first portion with the second portion to generate the full spatial map of the first electric vehicle 105. The process executor 125 can run one or more applications on the full spatial map, e.g., autonomous driving, driver assist, assisted breaking, collision avoidance.

In some cases, the process distributor 130 can request the second portion of the spatial map without determining the overlap. For example, the process distributor 130 may assume that the second electric vehicle 110 has or can compute the second portion of the spatial map. The process distributor 130 can make this assumption responsive to determining a position or direction of the second electric vehicle 110, e.g., the second electric vehicle 110 is in front of the first electric vehicle 105 traveling in the same direction as the first electric vehicle 105. The process distributor 130 can send a request for the second portion of the spatial map to the second electric vehicle 110. The process executor 125 can analyze the received second portion of the spatial map to identify that some of the spatial map is missing, e.g., the first portion. The process executor 125 can generate the first portion responsive to identifying that the first portion is missing from the spatial map received from the second electric vehicle 110.

Instead of both electric vehicles 105 and 110 generating the full spatial map, a portion of the spatial map can be generated by each of the electric vehicles 105 and 110, in some cases. The portion of the spatial map generated by the first electric vehicle 105 can be a portion of the spatial map that is unique to the first electric vehicle 105 and does not overlap (e.g., a non-overlapping portion) with the spatial map generated and used by applications of the second electric vehicle 110. The second electric vehicle 110 can generate a portion of a spatial map or a full spatial map used by applications of the second electric vehicle 110. The portion of the spatial map or the full spatial map can include an overlapping portion. The overlapping portion can be a portion of the spatial map of the second electric vehicle 110 that overlaps with the spatial map used by applications of the first electric vehicle 105. The second electric vehicle 110 can transmit the overlapping portion of the spatial map of the second electric vehicle 110 to the first electric vehicle 105 via the radio communication circuit 205. The first electric vehicle 105 can join the overlapping portion of the spatial map generated by the first electric vehicle 105 with the portion of the spatial map generated by the second electric vehicle 110 to generate the full spatial map. Portions of the spatial maps of the electric vehicles 105 and 110 may overlap if the electric vehicles 105 and 110 are in close proximity with each other. For two or more electric vehicles (e.g., large convoy of electric vehicles) all in close proximity, distributed processing that accounts for spatial map overlap can greatly reduce the processing consumption of the electric vehicles and battery power consumption of the electric vehicles.

The process executor 125 can execute a first process to generate a first data set. The process executor 195 can execute a second process to generate a second data set. The first data set and the second data set can each respectively include data such as a spatial map, data indicating an accident on a road, data describing road conditions, data describing weather, a RADAR map, a weather map generated based on RADAR data, a traffic pattern map. At least a portion of the first data set and the second data set can overlap. The process distributor 130 can determine that the first data set and the second data set overlap. The process distributor 130 can determine that the first data set and the second data set overlap based on positions of the first electric vehicle 105 and the second electric vehicle 110. The process distributor 130 can determine that the data sets overlap based on receiving the data set from the second electric vehicle 110 in the message. The process distributor 130 can compare the received data set to a data set generated by the process executor 125 to identify a level of overlap between the two data sets. Responsive to determining that the first data set and the second data set overlap, the process distributor 130 can determine to split an operation that generates a full data set for the first electric vehicle 105 into a first process for execution by the process executor 125 of the first electric vehicle 105 and a second process for execution by the process executor 195.

The first electric vehicle 105 can receive the message from the second electric vehicle 110 via the radio communication circuit 150. The radio communication circuit 205 can transmit the message to the radio communication circuit 150. The radio communication circuit 150 can provide the message to a process distributor 130 of the data processing system 115. The data processing system 155 can include a process distributor 200. The process distributor 130 of the first electric vehicle 105 and the process distributor 200 of the second electric vehicle 110 can be the same instance of a software module or instances of similar software modules. The process distributor 130 can identify an operation executed by the process executor 125. The process distributor 130 can identify an operation that can be split into multiple processes for distributed processing. The processes can be computing tasks or computing threads. The operation can be applying a SLAM to a point cloud to generate a spatial map. The process distributor 130 can analyze tags or identifiers of various operations performed or stored by the process executor 125 to determine that the operation can be split into multiple processes. The tags or identifiers can indicate the eligibility of an operation to be split into multiple processes.

The process distributor 130 can receive the message from the message distributor 160. The process distributor 130 can include a vehicle eligibility identifier 135. The vehicle eligibility identifier 135 can determine whether the second electric vehicle 110 is eligible for performing distributed processing. The vehicle eligibility identifier 135 can identify whether an operation can be split by an operation splitter 145 of the process distributor 130 and transmitted to the second electric vehicle 110. The vehicle eligibility identifier 135 can identify the eligibility of the second electric vehicle 110 based on an identifier of the second electric vehicle 110 included in the message. The vehicle eligibility identifier 135 can compare the identifier to a set of identifiers that are associated with electric vehicles that are eligible for performing distributed processing. For example, certain model vehicles or vehicles running certain software versions may be eligible for performing distributed processing and the identifiers of these vehicles can be included in the set of identifiers. By checking the identifier to determine eligibility, the vehicle range predictor 140 can prevent vehicle impersonation or spoofing.

The process distributor 130 can include a vehicle range predictor 140. The process distributor can predict that a duration of a communication channel between the first electric vehicle 105 and the second electric vehicle 110 satisfies a threshold (e.g., is greater than or equal to the threshold). The process distributor 130 can predict the duration of the communication channel based on the message. The process distributor 130 can compare the duration of the communication channel to the threshold, responsive to predicting the duration. The vehicle range predictor 140 can determine, calculate, or predict the duration of the communication channel based on a speed of the second electric vehicle 110 and a direction of travel of the second electric vehicle 110. The vehicle range predictor 140 can predict the duration of the communication channel based on the speed of the second electric vehicle 110 and the direction of travel of the second electric vehicle 110 relative to a speed of the first electric vehicle 105 and a direction of travel of the first electric vehicle 105. The vehicle range predictor 140 can predict the duration of the communication channel based on an altitude of the second electric vehicle 110. The vehicle range predictor 140 can predict the duration of the communication channel based on an altitude of the second electric vehicle 110 relative to an altitude of the first electric vehicle 105. The speed, direction, or altitude used by the vehicle range predictor 140 can be included in the message transmitted from the second electric vehicle 110 to the first electric vehicle 105. The vehicle range predictor 140 can determine, based on the altitudes, that a difference of the altitudes (e.g., an absolute value of the difference of the altitudes) is less than a threshold. The vehicle range predictor 140 can predict the speed and direction of the second electric vehicle 110 based on sensors of the first electric vehicle 105, e.g., a camera system of the first electric vehicle 105, a radio detection and ranging (RADAR) system of the first electric vehicle 105, a light detection and ranging (LIDAR) system of the first electric vehicle 105, an ultrasonic sensing system of the first electric vehicle 105.

The vehicle range predictor 140 can predict a length of time that the first electric vehicle 105 and the second electric vehicle 110 will be within a predefined distance from each other. The predefined distance may be a distance for the radio communication circuit 150 to communicate with the radio communication circuit 205. The vehicle range predictor 140 can determine a Euclidian distance between the first electric vehicle 105 and the second electric vehicle 110. The predefined distance can be a distance over which the radio communication circuit 150 can exchange data packets with the radio communication circuit 205 with a predetermined or desired quality of service (e.g., latency, bit error rate, packet loss, jitter, or signal-to-noise ratio). The vehicle range predictor 140 can compare the length of time to a threshold length of time. The threshold length of time can be based on a predicted length of time for the second electric vehicle 110 to perform a process for distributed processing. The vehicle range predictor 140 can receive an indication of an identified operation from a process executor 125 of the data processing system 115. The vehicle range predictor 140 can analyze the operation, or a process that results from splitting the operation, to determine the threshold length of time. The threshold length of time can be a length of time to perform the operation, or the process that results from splitting the operation into multiple processes. The vehicle range predictor 140 can determine the threshold length of time based on available computational resources of the second electric vehicle 110. The vehicle range predictor 140 can determine, based on the available computational resources of the second vehicle, whether to split the operation into the a first process and a second process for distributed processing by the first electric vehicle 105 and the second electric vehicle 110. The vehicle range predictor 140 can identify the available computational resources from the message transmitted by the radio communication circuit 205 to the radio communication circuit 150. The vehicle range predictor 140 can determine the threshold length of time by predicting a length of time for the available computational resources of the second electric vehicle 110 to perform the operation or the process that results from splitting the operation into multiple processes.

The vehicle range predictor 140 can identify a threshold time for performing a particular process to be distribute to the second electric vehicle 110. The vehicle range predictor 140 can predict a future location of the first electric vehicle 105 and a future location of the second electric vehicle 110 at a value of the threshold time into the future. The vehicle range predictor 140 can determine, based on the predicted future locations of the first electric vehicle 105 and the second electric vehicle 110, that the first electric vehicle 105 and the second electric vehicle 110 are a particular distance apart. The vehicle range predictor 140 can compare the distance to a threshold distance. The vehicle range predictor 140 can determine to perform distributed processing with the second electric vehicle 110 responsive to the predicted distance satisfying the threshold distance, e.g., the predicted distance being less than or equal to the threshold distance. The threshold distance can be a maximum distance between the first electric vehicle 105 and the second electric vehicle 110 that communication can occur. The threshold distance can be a particular distance between the first electric vehicle 105 and the second electric vehicle 110 that communication can occur in a reliable manner, e.g., with a particular signal strength, or a particular data error rate.

The operation splitter 145 can determine whether to split the operation into a first process and a second process for distributed processing by the first electric vehicle 105 and the second electric vehicle 110 based on a timestamp of the message received from the second electric vehicle 110. The timestamp can indicate a time that the message was generated. The operation splitter 145 can determine an amount of time that has elapsed since the message was generated. The operation splitter can compare the amount of time to a threshold. Responsive to a determination that the amount of time that has elapsed satisfies the threshold, the operation splitter 145 can split the operation into a first process and a second process. The length of time meeting the threshold can indicate that the message is relatively new and that the data of the message can be assumed to be accurate, e.g., that the amount of time that has elapsed since the message was generated is less than the threshold.

The operation splitter 145 can determine to split the operation into multiple processes based on the determinations made by the vehicle range predictor 140. For example, the operation splitter 145 can determine to split the operation responsive to the prediction by the vehicle range predictor 140 that the duration of the communication channel satisfies the threshold. The operation splitter 145 can split the operation into a first process and a second process for distributed processing by the first electric vehicle 105 and the second electric vehicle 110. The operation splitter 145 can identify a set of electric vehicles to distribute the operation to. The operation splitter 145 can split the operation into a particular number of processes based on the number of vehicles in the set of electric vehicles. For example, the number of processes may be equal to the number of electric vehicles. The operation splitter 145 can split the operation by generating a first process (e.g., a first computing job) including a first portion of operations of the operation and generating a second process (e.g., a second computing job) including a second portion of the operations. The radio communication circuit 150 can transmit the second process with a request to perform the second process to the second electric vehicle 110.

The operation splitter 145 can generate an indication of a first process stored by the electric vehicle and a second process stored by the second electric vehicle 110. The indication can be a process identifier identifying the first process or the second process. Instead of, or in addition to, communicating the second process itself to the second electric vehicle 110, the radio communication circuit 150 can transmit a request to perform the second process to the second electric vehicle 110. The request can include the identifier of the second process stored by the second electric vehicle 110. The second electric vehicle 110 can use the identifier to identify the second process and execute the second process. By communicating the identifier of the process instead of the process itself by the first electric vehicle 105, a usage of radio communication bandwidth can be reduced.

The radio communication circuit 205 of the second electric vehicle 110 can receive the process split by the operation splitter 145. The radio communication circuit 205 can receive a request from the second electric vehicle 110 to perform the process. The request can include the process itself or an identifier of the process. The process executor 195 can execute the process received from the first electric vehicle 105. If the process is already stored by the process executor 195, the process executor 195 can use an identifier received from the first electric vehicle 105 to identify the process. Responsive to identifying the process, the process executor 195 can execute the process. The process stored by the process executor 195 can be a piece of software loaded onto the second electric vehicle 110 during a manufacturing or provisioning stage of the second electric vehicle 110. The process can be an operation of the second electric vehicle 110, e.g., a SLAM operation, a weather map generation operation, a traffic pattern map operation, an autonomous driving operation, a driver assist operation, an emergency braking operation, a collision avoidance operation. The process stored by the second electric vehicle 110 can be a process previously distributed to the second electric vehicle 110 by the first electric vehicle 105. To avoid repeatedly transmitting the process from the first electric vehicle 105 to the second electric vehicle 110, the second electric vehicle 110 can persist the process in storage. After the process is first transmitted from the first electric vehicle 105, e.g., during a first distributed processing session, the first electric vehicle 105 can send requests to the second electric vehicle 110 to execute the previously transmitted process, e.g., during a second distributed processing session performed after the first distributed processing session.

The process executor 195 can execute the process to generate result data. The result data can be a result of the process. The result can be a spatial map. The result can be a driving suggestion for the first electric vehicle 105, e.g., change lanes, increase speed, or decrease speed. The result data can be a portion of a result that the operation would generate. The portion of the result, joined with other result data, can be the result of the operation. The process executor 125 can generate the other result data by executing another process split by the operation splitter 145. For example, for an operation split into a first process and a second process by the operation splitter 145, the process executor 125 can execute the first process and the process executor 195 can execute the second process. The process executor 125 can generate first result data by executing the first process. The process executor 195 can generate second result data by executing the second process. The process executor 195 can transmit the second result data to the first electric vehicle 105 via the radio communication circuit 205. The process executor 125 can generate a result for the operation based on the first result data and the second result data. The process executor 125 can join the first result data and the second result data into the result of the operation. The first result data can be a first portion of a spatial map generated by executing the operation. The second result data can be a second portion of the spatial map generated by executing the operation. Joining the first result data and the second result data can generate the spatial map.

The process executor 125 can determine whether the process executor 195 has encountered an error in completing the second process or returning a result of the second process. The process executor 125 can generate a time since the second process was distributed to the second electric vehicle 110 for distributed processing. The process executor 125 can compare the time since the second process was distributed to a threshold time. If the time exceeds the threshold time, the process executor 125 can determine that the process executor 195 has encountered an error in completing the second process or returning a result of the second process. Responsive to detecting the error, the process executor 125 can complete the second process. The process executor 125 can join a result of the second process executed by the process executor 125 with a result of a first process executed by the process executor 125. The process executor 125 can determine the time threshold based on a length of time that it is expected the second process to take. The process executor 125 can determine the time threshold to be a sum of a predetermined time (a time amount that provides a grace period for the process executor 195 to finish the second process) and the expected length of time to perform the second process.

While FIG. 1 provides an example of two vehicles performing distributed processing, this technical solution can perform distributed processing using two or more vehicles (e.g., three vehicles, four vehicles, ten vehicles, fifty vehicles, or any other number of vehicles). For example, two or more vehicles can include the same, or similar, components or functionality to perform the distributed processing depicted in FIG. 1. For example, multiple vehicles at a camp site can work together to generate spatial maps through distributed processing. Multiple vehicles at a job site that belong to one or multiple construction, mining, of forestry companies can implement the distributed processing. While the first electric vehicle 105 is described as distributing a process to the second electric vehicle 110 in FIG. 1, the second electric vehicle 110 can distribute processes to the first electric vehicle 105 to complete.

The first electric vehicle 105 can further distribute a process to a third vehicle through the second electric vehicle 110. For example, the first electric vehicle 105 may be in a line-of-sight communication with the second electric vehicle 110. A third vehicle, not in a line-of-sight communication with the first electric vehicle 105 can be in a line-of-sight communication with the second electric vehicle 110. The first electric vehicle 105 can be connected with the third vehicle via the second electric vehicle 110. The first electric vehicle 105 can split an operation into three processes. A first process can be performed by the first electric vehicle 105. A second process can be distributed to the second electric vehicle 110 for the second electric vehicle 110 to perform. A third processes can be distributed to the third vehicle. The first electric vehicle 105 can transmit the third process to the second electric vehicle 110. The second electric vehicle 110 can transmit the third process to the third vehicle. The third vehicle can execute the third process and generate a result. The third vehicle can transmit the result to the second electric vehicle 110. The second electric vehicle 110 can transmit the result to the first electric vehicle 105.

Figure 2:
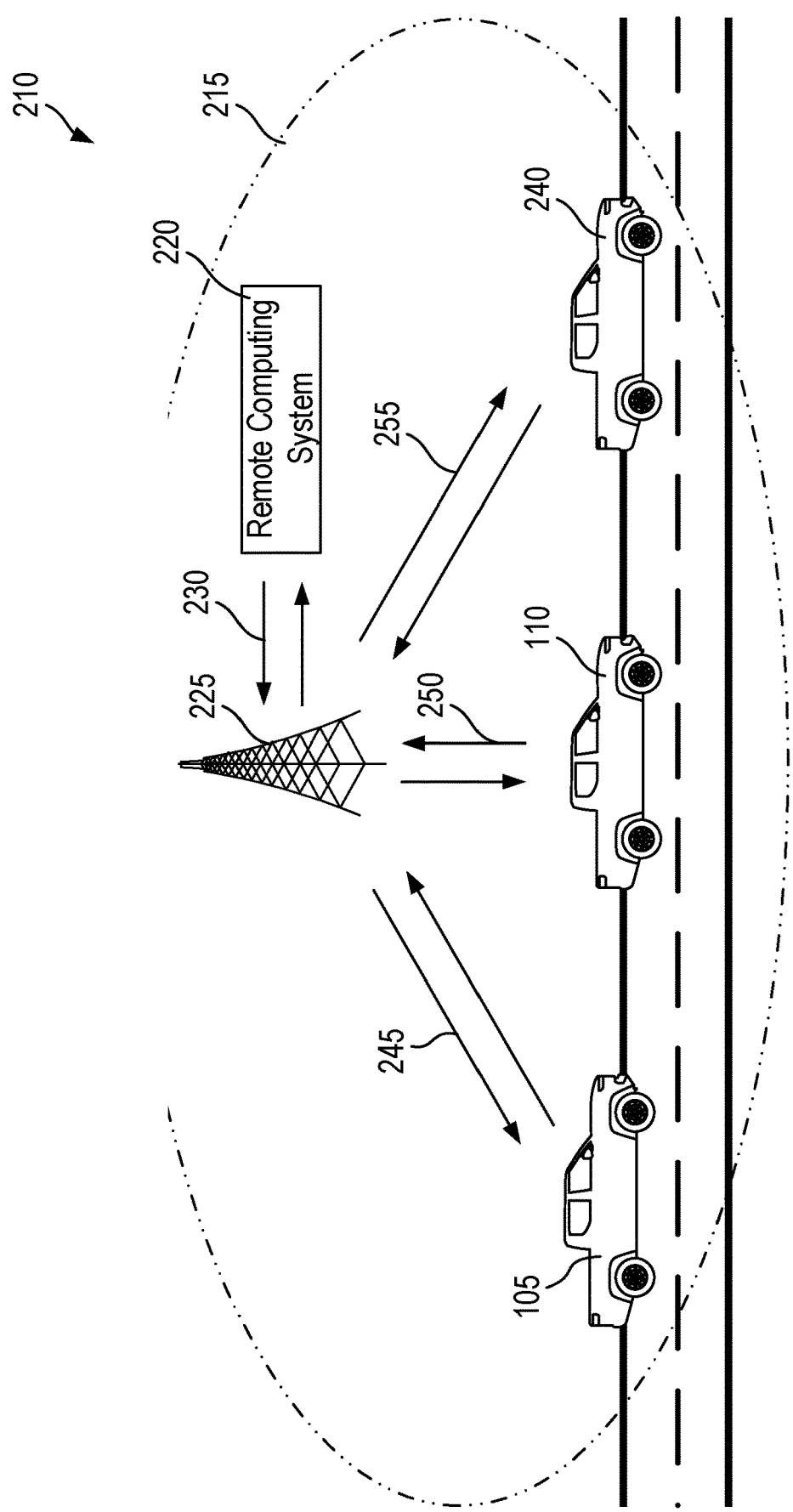
FIG. 2 depicts an example RAN with which multiple vehicles can communication.

FIG. 2 depicts an example of a system 210 that can include a RAN 255 with which the first electric vehicle 105, the second electric vehicle 110, and an electric vehicle 240 communicate. The vehicle 240 can include one or more system, component or functionality of vehicle 105 or vehicle 110. The RAN 225 can include one or multiple base stations. The base stations can include antennas that perform wireless communication with the first electric vehicle 105, the second electric vehicle 110, and the electric vehicle 240. The RAN 225 can have a communication range 215. The range 215 can be a circular shape, an oval shape, a cardioid shape, a freeform shape. When the first electric vehicle 105, the second electric vehicle 110, and the electric vehicle 240 are within the range 215, the first electric vehicle 105, the second electric vehicle 110, and the electric vehicle 240 can establish communication channels 245, 250, and 255 respectively with the RAN 225.

The RAN 225 can connect the first electric vehicle 105, the second electric vehicle 110, and the electric vehicle 240 with a remote computing system 220. The remote computing system 220 can be a cloud computing system connected with the RAN via the Internet and a core network. The remote computing system 220 can communicate with the RAN 225 via a communication channel 230. The remote computing system 220 can be a mobile edge computing (MEC) platform. The first electric vehicle 105, the second electric vehicle 110, and the electric vehicle 240 can offload computing operations to the remote computing system 220 via communication with the RAN over the communication channels 245, 250, and 255 respectively.

The first electric vehicle 105, the second electric vehicle 110, and the electric vehicle 240 can each perform local applications. The applications can be ADAS applications or other driving assistance features. The applications can run on a spatial map computed by the remote computing system 220. The first electric vehicle 105, the second electric vehicle 110, and the electric vehicle 240 can communicate sensor data collected via the sensors of the first electric vehicle 105, the second electric vehicle 110, and the electric vehicle 240. The remote computing system 220 can use the sensor data to generate a spatial map for each of the first electric vehicle 105, the second electric vehicle 110, and the electric vehicle 240. The remote computing system can communicate the spatial map to each of the first electric vehicle 105, the second electric vehicle 110, and the electric vehicle 240.

Figure 3:
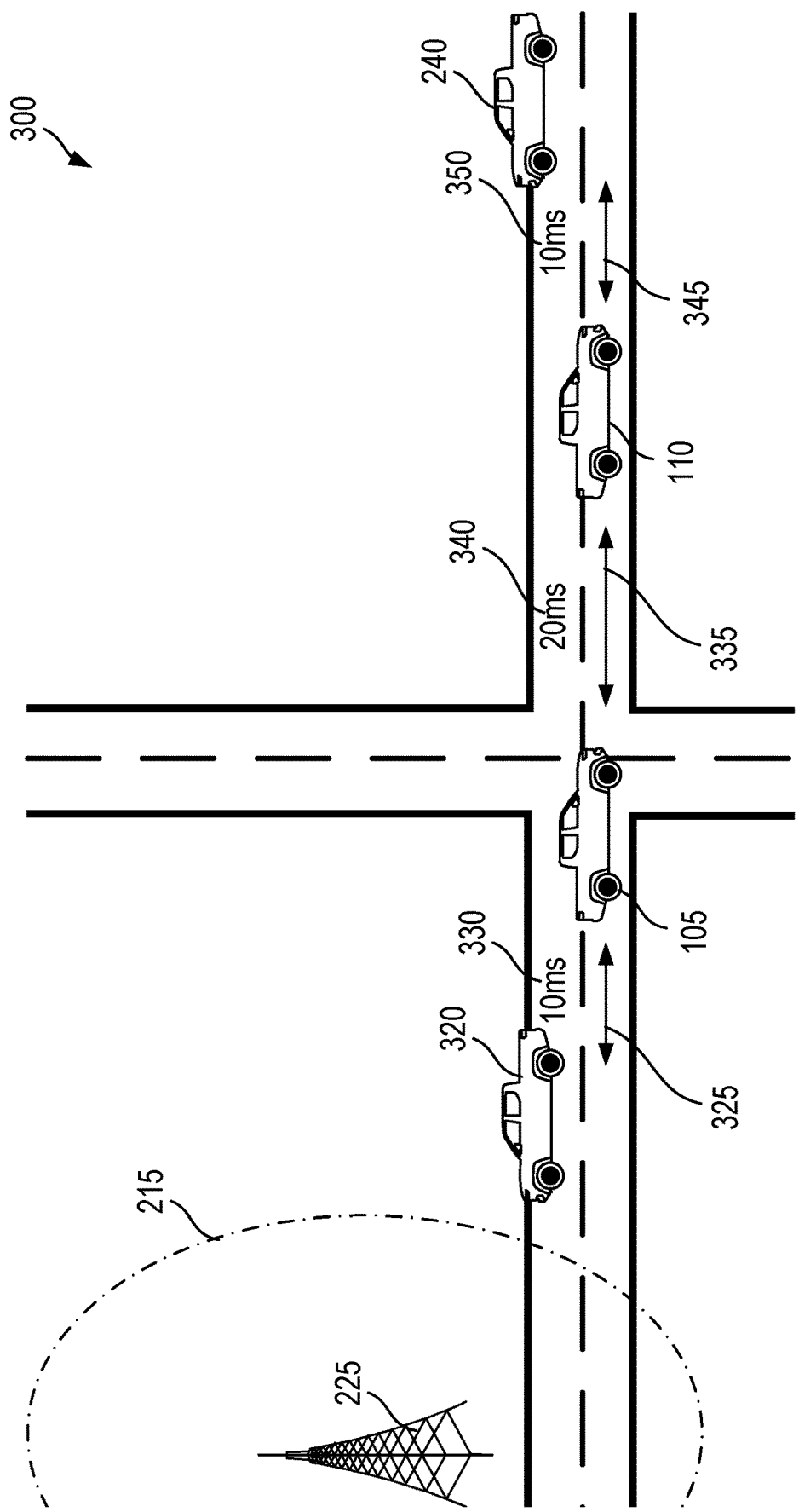
FIG. 3 depicts an example where vehicles distribute operations.

FIG. 3 depicts an example of a system 300 where an electric vehicle 320, the first electric vehicle 105, the second electric vehicle 110, and the electric vehicle 240 distribute operations. The vehicles 240 or 320 can include one or more system, component or functionality of vehicle 105 or vehicle 110. In the example of FIG. 3, the electric vehicle 320, the first electric vehicle 105, the second electric vehicle 110, and the electric vehicle 240 are outside the communication range 215. While the first electric vehicle 105 is within the communication range 215 of the RAN, the first electric vehicle 105 can perform communication with the RAN via the communication channel 245. The first electric vehicle 105 can perform the communication via radio communication circuit 150. The communication can cause the remote computing system 220 to perform an operation for the first electric vehicle 105. The first electric vehicle 105 can detect a communication issue with the RAN based on the communication. For example, the first electric vehicle 105 (which is traveling away from the RAN 225) can detect that the first electric vehicle 105 is no longer within the communication range 215. Responsive to detecting the communication issue, the first electric vehicle 105 (e.g., the operation splitter 145) can determine to split the operation into the first process and the second process for distributed processing by the first electric vehicle 105 and another electric vehicle (e.g., the second electric vehicle 110). The first electric vehicle 105 can detect a communication issue by identifying that a message is corrupt, that a response has not been received from the RAN 225, that a signal strength of the RAN 255 is less than a threshold.

The electric vehicle 320, the first electric vehicle 105, the second electric vehicle 110, and the electric vehicle 240 can operate in areas without consistent network connection to the RAN 225. For example, the electric vehicle 320, the first electric vehicle 105, the second electric vehicle 110, and the electric vehicle 240 can be driving off road in a park, campsite, field, or forest outside of the range 215 of the RAN 225. The electric vehicle 320, the first electric vehicle 105, the second electric vehicle 110, and the electric vehicle 240 can be on a remote road outside the range 215 of the RAN 225. The electric vehicle 320, the first electric vehicle 105, the second electric vehicle 110, and the electric vehicle 240 can be at job sites that are outside the RAN 255. For example, the electric vehicle 320, the first electric vehicle 105, the second electric vehicle 110, and the electric vehicle 240 can be located at mines, factories, solar panel fields, windmill fields, construction sites. When the electric vehicle 320, the first electric vehicle 105, the second electric vehicle 110, and the electric vehicle 240 are at a location without access to the RAN 225, the electric vehicle 320, the first electric vehicle 105, the second electric vehicle 110, and the electric vehicle 240 can determine to distribute operations for distributed process.

The electric vehicle 320, the first electric vehicle 105, the second electric vehicle 110, and the electric vehicle 240 can each share a process with one or more of the electric vehicle 320, the first electric vehicle 105, the second electric vehicle 110, and the electric vehicle 240. In some cases, the onboard computational resources of the electric vehicle 320, the first electric vehicle 105, the second electric vehicle 110, and the electric vehicle 240 may be insufficient to simultaneously perform a SLAM to generate a spatial map and an ADAS task that operates on the spatial map and therefore the electric vehicle 320, the first electric vehicle 105, the second electric vehicle 110, and the electric vehicle 240 can distribute operations for distributed processing. In some cases, the onboard computational resources of the electric vehicle 320, the first electric vehicle 105, the second electric vehicle 110, and the electric vehicle 240 are sufficient to simultaneously perform a SLAM to generate a spatial map and an ADAS task that operates on the spatial map but the electric vehicle 320, the first electric vehicle 105, the second electric vehicle 110, and the electric vehicle 240 can distribute operations for distributed processing to reduce battery power consumption or reduce processor or memory utilization.

The electric vehicle 320, the first electric vehicle 105, the second electric vehicle 110, and the electric vehicle 240 can transmit messages to each other. The messages can indicate speed of the respective vehicle, direction of travel of the respective vehicle, available computational resources of the respective vehicle. Based on a message received from the electric vehicle 320, the first electric vehicle 105 can determine a duration of a communication channel 325 between the electric vehicle 320 and the first electric vehicle 105. In some cases, the electric vehicle 320 can determine the duration of the communication channel 325 based on a message received from the first electric vehicle 105. The channel 330 can also have a latency based on distance between the electric vehicle 320 and the first electric vehicle 105. The electric vehicle 320 or the first electric vehicle 105 can determine the latency to be ten milliseconds, for example.

Based on a message received from the second electric vehicle 110, the first electric vehicle 105 can determine a duration of a communication channel 335 between the second electric vehicle 110 and the first electric vehicle 105. In some cases, the second electric vehicle 110 can determine the duration of the communication channel 335 based on a message received from the first electric vehicle 105. The channel 335 can also have a latency 340 based on distance between the first electric vehicle 105 and the second electric vehicle 110. The first electric vehicle 105 or the second electric vehicle 110 can determine the latency 340 to be twenty milliseconds, for example. Based on a message received from the electric vehicle 240, the second electric vehicle 110 can determine a duration of a communication channel 345 between the electric vehicle 240 and the second electric vehicle 110. The electric vehicle 240 can determine the duration of the communication channel 345 based on a message received from the second electric vehicle 110. The channel 330 can also have a latency 350 based on distance. The electric vehicle 320 or the first electric vehicle 105 can determine the latency 350 to be ten milliseconds, for example.

The electric vehicle 320, the first electric vehicle 105, the second electric vehicle 110, and the electric vehicle 240 can distribute processes for distributed processing based on an optimization that considers an expected runtime of a process to be distributed, a communication range of each vehicle, a rate and direction of travel of the vehicles, a duration of a communication channel between the electric vehicles, and latency caused by geospatial distance among vehicles. The first electric vehicle 105 can distribute a process to the second electric vehicle 110 instead of the electric vehicle 320 responsive to identifying, based on messages received from the electric vehicles 110 and 320, that the communication channel 335 has a longer duration than the communication channel 325. Furthermore, the first electric vehicle 105 can select the second electric vehicle 110 over the electric vehicle 320 responsive to determining that the first electric vehicle 105 and the second electric vehicle 110 are traveling in the same direction while the first electric vehicle 105 and the electric vehicle 320 are traveling in opposite directions. An optimization can prioritize the second electric vehicle 110 over the electric vehicle 320, even though the latency of the communication channel 335 is greater than the latency of the communication channel 325 because the electric vehicles are traveling in the same direction. The optimization can be a multifactor simulated annealing algorithm.

Figure 4:
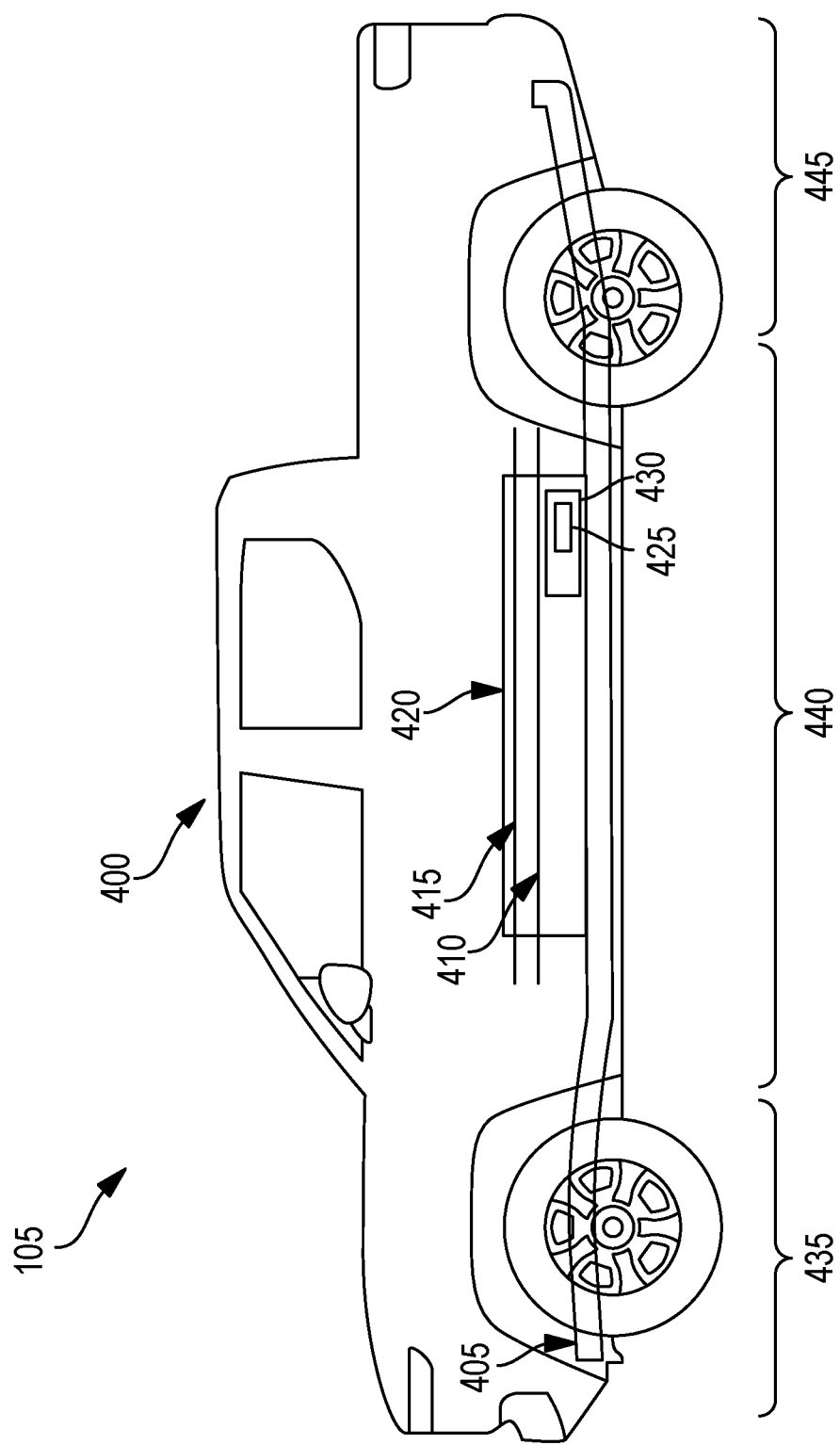
FIG. 4 depicts an example electric vehicle.

FIG. 4 depicts an example cross-sectional view 400 of an first electric vehicle 105 installed with at least one battery pack 420. The first electric vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 420 can also be used as an energy storage system to power a building, such as a residential home or commercial building. The first electric vehicle 105 can be fully electric or partially electric (e.g., plug-in hybrid) and further, the first electric vehicle 105 can be fully autonomous, partially autonomous, or unmanned. The first electric vehicle 105 can also be human operated or non-autonomous. The first electric vehicle 105 such as electric trucks or automobiles can include on-board battery packs 420, battery modules 430, or battery cells 425 to power the electric vehicles. The first electric vehicle 105 can include a chassis 405 (e.g., a frame, internal frame, or support structure). The chassis 405 can support various components of the first electric vehicle 105. The chassis 405 can span a front portion 435 (e.g., a hood or bonnet portion), a body portion 440, and a rear portion 445 (e.g., a trunk, payload, or boot portion) of the first electric vehicle 105. The battery pack 420 can be installed or placed within the first electric vehicle 105. For example, the battery pack 420 can be installed on the chassis 405 of the first electric vehicle 105 within one or more of the front portion 435, the body portion 440, or the rear portion 445. The battery pack 420 can include or connect with at least one busbar, e.g., a current collector element. For example, the first busbar 415 and the second busbar 410 can include electrically conductive material to connect or otherwise electrically couple the battery packs 420 or the battery cells 425 with other electrical components of the first electric vehicle 105 to provide electrical power to various systems or components of the first electric vehicle 105.

Figure 5:
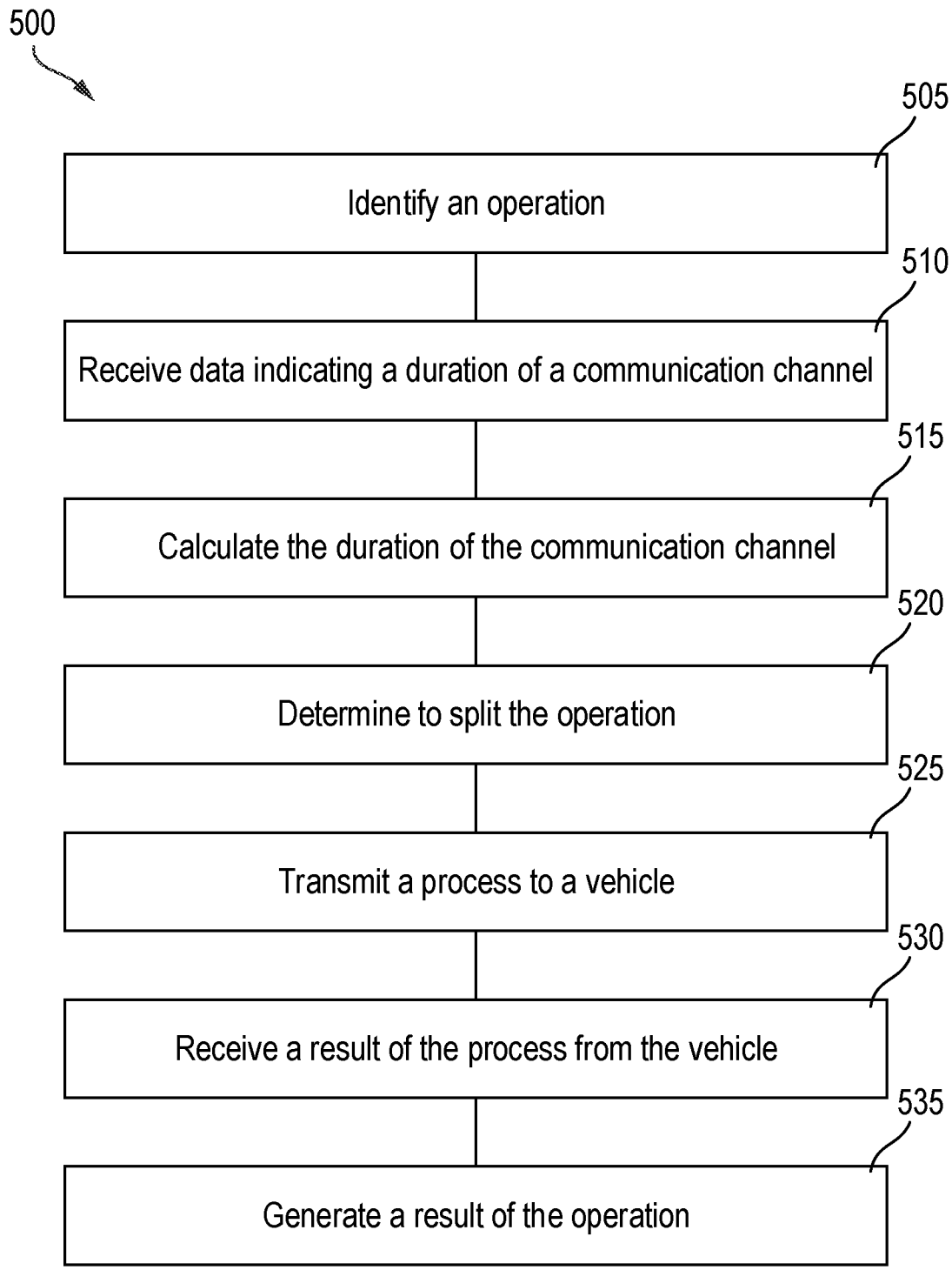
FIG. 5 is a flow diagram depicting an example method for a first vehicle to distribute an operation to a second vehicle.

FIG. 5 is a flow diagram depicting an example method 500 for a first vehicle to distribute an operation to a second vehicle. The method 500 can be performed by one or more systems or components depicted in FIGS. 1-4 and FIG. 8, including, for example, an first electric vehicle 105 or data processing system 115. The method 500 can be performed by one or more systems or components of the second electric vehicle 110 described in FIGS. 1-3. The method 500 can be performed by one or more systems or components of the electric vehicle 240 described in FIGS. 2-3. The method 500 can be performed by one or more systems or components of the electric vehicle 320 described in FIG. 3. The method 500 can include any one or more of ACTS 505-535. The ACTS 505-535 can be performed in various orders and are not limited to the order shown in FIG. 5. ACT 505 identifies an operation. ACT 510 receives data indicating a duration of a communication channel. ACT 515 calculates the duration of the communication channel. ACT 520 determines to split the operation. ACT 525 transmits a process to a vehicle. ACT 530 receives a result of the process from the vehicle. ACT 535 generates a result of the operation.

At ACT 505, the method 500 can include a data processing system (e.g., the data processing system 115) of a vehicle (e.g., the first electric vehicle 105) identifying an operation.

The operation can be a resource intensive operation for the vehicle. The resource intensive operation can be performing a SLAM to generate a spatial map based on a point cloud. The point cloud can be data collected by sensors of the vehicle. The operation can be ADAS tasks. The ADAS tasks can execute on the spatial map. ADAS tasks can include collision avoidance, adaptive cruise control, vehicle speed suggestions, emergency braking actions, autonomous parking, or autonomous driving.

At ACT 510, the method 500 can include a data processing system (e.g., the data processing system 115) of a vehicle (e.g., the first electric vehicle 105) receiving data indicating a duration of a communication channel. The duration of the communication channel can indicate a duration of a communication channel between a first vehicle (e.g., the first electric vehicle 105) and a second vehicle (e.g., the second electric vehicle 110). The data can include a speed of the second vehicle, a direction of travel of the second vehicle, a road traveled on by the second vehicle, a heading of the second vehicle, a destination that the second vehicle is traveling to. The second vehicle can generate a message including the data and transmit the message via a radio communication circuit (e.g., the radio communication circuit 205). The first vehicle can receive the message via a radio communication circuit (e.g., the radio communication circuit 150). The message can be communicated inter-vehicle without utilizing a RAN (e.g., the RAN 225). The message can be communicated via Sidelink. The first vehicle can receive the data from one or more sensors of the first vehicle (e.g., RADAR, LIDAR, ultrasonic sensors).

At ACT 515, the method 500 can include a data processing system (e.g., the data processing system 115) of a vehicle (e.g., the first electric vehicle 105) calculating the duration of the communication channel. A first vehicle (e.g., the first electric vehicle 105), based on the data received at ACT 510, can calculate, determine, or predict a duration of the communication channel. The first vehicle can determine a speed and direction of a second vehicle (e.g., the second electric vehicle 110) relative to the first vehicle. The speed and direction of the first vehicle and the second vehicle can indicate the duration of the communication channel. The first vehicle can determine that the second vehicle is traveling away from the first vehicle at a particular speed (e.g., both vehicles traveling in the same direction at different speeds or vehicles traveling in different directions) and that based on a wireless communication range, the second vehicle will be out of range after a particular amount of time has elapsed. The first vehicle can determine, based on the second process, a length of time required to perform the second process. The first vehicle can compare the length of time required to perform the process to a threshold. The threshold can be the duration of the communication channel. The first vehicle can determine to split the operation into the first process and the second process for distributed processing by the first vehicle and the second vehicle based on the length of time satisfying the threshold.

At ACT 520, the method 500 can include a data processing system (e.g., the data processing system 115) of a vehicle (e.g., the electric vehicle 105) determining to split the operation identified at ACT 505. A first vehicle can determine that the duration of the communication channel predicted at ACT 515 satisfies a threshold (e.g., is greater than or equal to the threshold). The first vehicle can store a predetermined threshold. The first vehicle can predict the threshold based on a length of time to perform the operation identified at ACT 505 or perform a portion of the operation. The first vehicle can determine to split the operation responsive to determining that the duration of the threshold satisfies the threshold. The first vehicle can determine to split the operation into a first process and a second process for distributed processing by the first vehicle and the second vehicle.

At ACT 525, the method 500 can include a data processing system (e.g., the data processing system 115) of a vehicle (e.g., the first electric vehicle 105) transmitting a process to a vehicle (e.g., the second electric vehicle 110). The process can be transmitted by a radio communication circuit (e.g., the radio communication circuit 150) of a first vehicle (e.g., the first electric vehicle 105) to a radio communication circuit (e.g., the radio communication circuit 205) of a second vehicle (e.g., the second electric vehicle 110). The first vehicle can determine to transmit the process to the second vehicle responsive to determining to split the operation at ACT 530. The first vehicle can transmit a second process to the second vehicle. The first vehicle can retain a first process and execute the first process to generate a first result.

At ACT 530, the method 500 can include a data processing system (e.g., the data processing system 115) of a vehicle (e.g., the first electric vehicle 105) receiving a result of the process from the vehicle (e.g., the second electric vehicle 110). The second vehicle (e.g., the second electric vehicle 110) that receives the transmission of ACT 525 can execute the process. The second vehicle can execute the process to generate result data. The second vehicle can execute the process on input data. The input data can be stored by the second vehicle or collected by the second vehicle from one or more sensors of the second vehicle. The input data can be received by the second vehicle from the vehicle that transmitted the process. For example, the second vehicle can execute a SLAM to generate a spatial map based on a point cloud. The point cloud can be stored by the second vehicle or transmitted to the second vehicle with the process by the vehicle. Responsive to the second vehicle completing the process, the second vehicle can transmit the result data to the first vehicle. The second vehicle can transmit the result data via a radio communication circuit (e.g., the radio communication circuit 205) to a radio communication circuit (e.g., the radio communication circuit 150) of the vehicle. The second vehicle can transmit the result via an inter-vehicle communication protocol. The second vehicle can transmit the result directly to the vehicle without accessing a RAN. The second vehicle can transmit the result via the RAN. The second vehicle can transmit the result to the vehicle via Sidelink.

At ACT 535, the method 500 can include a data processing system (e.g., the data processing system 115) of a vehicle (e.g., the first electric vehicle 105) generating a result of the operation. The vehicle can generate the result by joining the result received at ACT 530 with one or more other results. For example, the vehicle can receive another result from another vehicle. For example, the vehicle can split the operation into two processes. The vehicle can distribute a first process to a second vehicle and distribute a second process to a third vehicle. The vehicle can join the results of the first process received form the second vehicle with a second result of the second process received from the third vehicle. The vehicle can execute the first process itself and generate the a result. The vehicle can receive and join the results together. The vehicle can perform additional operations with the result of the operation. For example, the result of the operation can be a spatial map generated by distributing a SLAM across vehicles. The vehicle can execute ADAS tasks that consume the spatial map. The result of the ADAS tasks can be control decisions for controlling the vehicle. For example, based on the control decisions, the vehicle can speed up, slow down, brake, turn on, turn off, maneuver, switch lanes, exit a road, switch driving modes, park in a parking space.

Figure 6:
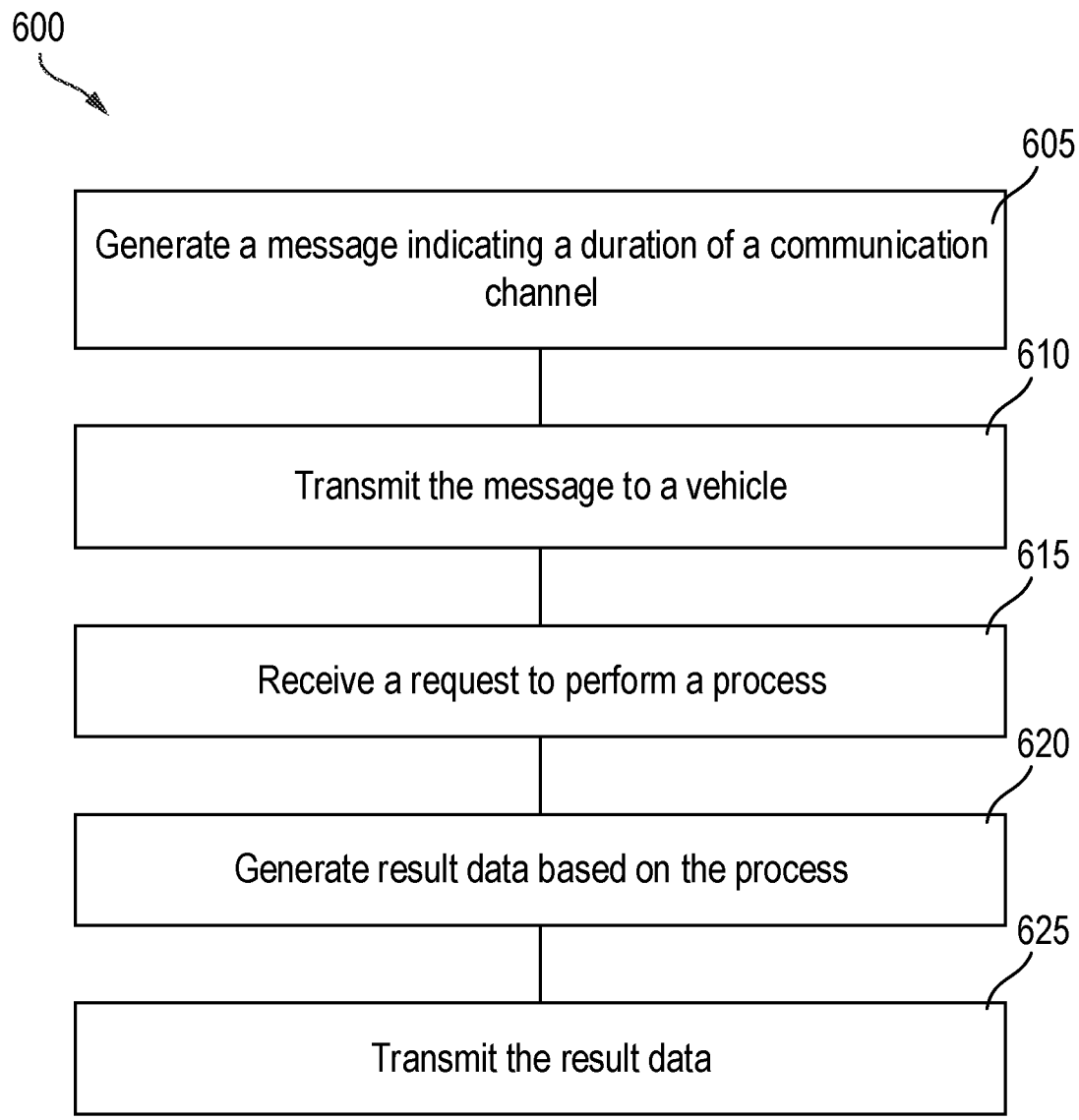
FIG. 6 is a flow diagram depicting an example method for a first vehicle to perform an operation distributed by a second vehicle.

FIG. 6 is a flow diagram depicting an example method 600 for a first vehicle to perform an operation distributed by a second vehicle. The method 600 can be performed by one or more systems or components of the second electric vehicle 110 described in FIGS. 1-3. The method 600 can be performed by one or more systems or components of the first electric vehicle 105 described in FIGS. 1-4 and FIG. 8. The method 600 can be performed by one or more systems or components of the electric vehicle 240 described in FIGS. 2-3. The method 600 can be performed by one or more systems or components of the electric vehicle 305 described in FIG. 3. The method 600 can include any one or more ACTS 605-525. The ACTS 605-625 can be performed in various orders. ACT 605 generates a message indicating a duration of a communication channel. ACT 610 transmits the message to a vehicle. ACT 615 receives a request to perform a process. ACT 620 generates result data based on the process. ACT 625 transmits the result data.

At ACT 605, the method 600 can include a data processing system (e.g., the data processing system 155) of a vehicle (e.g., the second electric vehicle 110) generating a message indicating a duration of a communication channel. The message can include indications of speed of the vehicle, direction of travel of the vehicle, a road that the vehicle is traveling on, a destination that the vehicle is taking, a route that the vehicle is following. A second vehicle (e.g., the first electric vehicle 105) can use the data of the message to determine the duration of the communication channel. The duration of the communication channel can indicate how long the vehicle and the second vehicle will be able to perform inter-vehicle communication based on their speeds and directions. The duration of the communication channel can indicate a length of a line-of-sight communication channel between the vehicle and the second vehicle.

At ACT 610, the method 600 can include a data processing system (e.g., the data processing system 155) of a vehicle (e.g., the second electric vehicle 110) transmitting the message to a vehicle (e.g., the first electric vehicle 105). The vehicle can transmit the message via a radio communication circuit (e.g., the radio communication circuit 205). The radio communication circuit can communicate the message to another radio communication circuit (e.g., the radio communication circuit 150) of a second vehicle (e.g., the first electric vehicle 105). The vehicle can generate or transmit the message periodically. For example, every five seconds the vehicle can transmit the message. The vehicle can continually or periodically generate and broadcast the message. The vehicle can transmit the message to the second vehicle responsive to a communication channel being initiated between the vehicle and the second vehicle. The communication channel can be initiated by the vehicle and the second vehicle by exchanging identifying information, encryption keys, generating communication channel data.

At ACT 615, the method 600 can include a data processing system (e.g., the data processing system 155) of a vehicle (e.g., the second electric vehicle 110) receiving a request to perform a process. The vehicle can receive the request from a second vehicle (e.g., the first electric vehicle 105). The request can request that a process stored by the vehicle be executed by the vehicle. The request can include the process itself. The second vehicle can determine that a duration of a communication channel between the vehicle and the second vehicle satisfies a threshold. Responsive to determining that the duration of the communication channel satisfying the threshold, the vehicle can split an operation into two processes. The second vehicle can transmit one of the processes to the vehicle.

At ACT 620, the method 600 can include a data processing system (e.g., the data processing system 155) of a vehicle (e.g., the second electric vehicle 110) generating result data based on the process. The vehicle can execute the process to generate the result data. The vehicle can identify a process stored by the vehicle that is associated with the request. The vehicle can execute the request. The vehicle can collect input data for executing the process. The vehicle can collect the input data from sensors of the vehicle, e.g., RADAR, LIDAR, ultrasonic sensors. The vehicle can receive the input data as part of the request. The input data can be collected by a second vehicle (e.g., the first electric vehicle 105) via sensors of the second vehicle. The second vehicle can send the input data along with the request to perform the process to the vehicle. The vehicle can execute the process with the received input data. The process can be a full or partial SLAM. The SLAM can generate a full or partial spatial map.

At ACT 625, the method 600 can include a data processing system (e.g., the data processing system 155) of a vehicle (e.g., the second electric vehicle 110) transmitting the result data. The vehicle can transmit the result data to a second vehicle (e.g., first electric vehicle 105). The vehicle can transmit the result data to the vehicle that transmitted the request received at ACT 615. The vehicle can transmit the result data via a radio communication circuit (e.g., the radio communication circuit 205). The vehicle can transmit the result data directly to the second vehicle. For example, the vehicle can transmit the result data via an inter-vehicle communication protocol. For example, the vehicle can transmit the result data via Sidelink.

Figure 7:
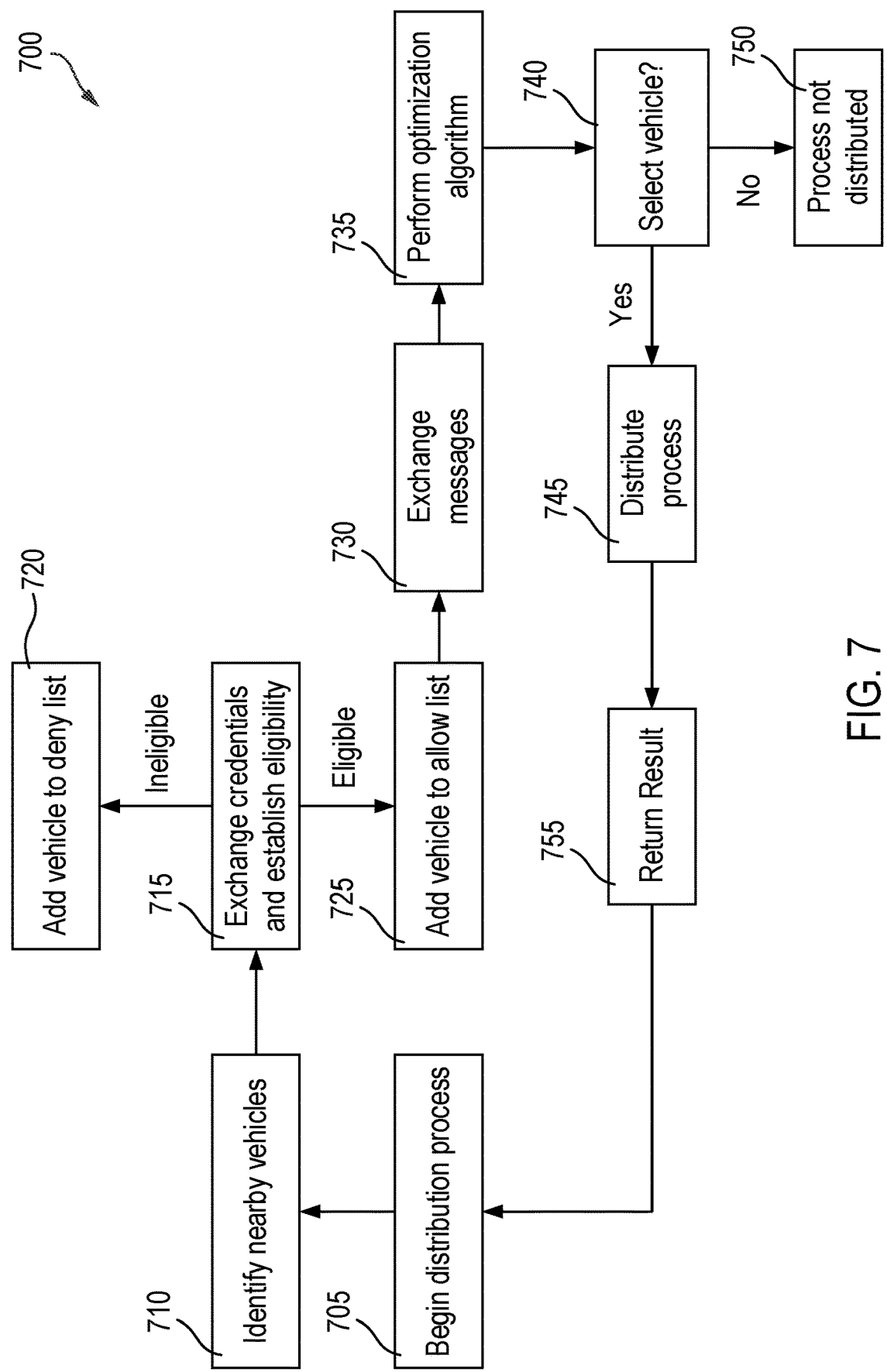
FIG. 7 is another flow diagram depicting an example method for a first vehicle to distribute an operation to a second vehicle.

FIG. 7 is a flow diagram depicting an example method for a first vehicle to distribute an operation to a second vehicle. The method 700 can be performed by one or more systems or components of the first electric vehicle 105 described in FIGS. 1-4 and FIG. 8. The method 700 can be performed by one or more systems or components of the second electric vehicle 110 described in FIGS. 1-3. The method 700 can be performed by one or more systems or components of the electric vehicle 240 described in FIGS. 2-3. The method 700 can be performed by one or more systems or components of the electric vehicle 305 described in FIG. 3. The method 700 can include any one or more ACTS 705-755. The ACTS 705-755 can be performed in various orders. ACT 705 a distribution process is begun. ACT 710 identifies nearby vehicles. ACT 715 exchanges credentials and establishes eligibility. ACT 720 adds a vehicle to a deny list. ACT 725 adds as vehicle to an allow list. ACT 730 exchanges messages. ACT 735 performs an optimization algorithm. ACT 740 selects a vehicle. ACT 745 distributes a process. ACT 750 does not distribute a process. ACT 755 returns a result.

At ACT 705, the method 700 can include a data processing system (e.g., the data processing system 115) of a vehicle (e.g., the first electric vehicle 105) beginning a distribution process. The vehicle can begin the distribution process periodically. The vehicle can begin the distribution process responsive to identifying an operation is scheduled for execution. For example, the vehicle can identify an operation. The operation can be scheduled to be performed. The vehicle can identify that a likelihood of calling the operation is high based on historic execution frequencies of the operation.

At ACT 710, the method 700 can include a data processing system (e.g., the data processing system 115) of a vehicle (e.g., the first electric vehicle 105) identifying nearby vehicles. The vehicle can identify nearby vehicles with the V2X protocol. A radio communication circuit (e.g., the radio communication circuit 150) can execute Sidelink and utilize a V2X protocol to identify nearby vehicles (e.g., the second electric vehicle 110).

At ACT 715, the method 700 can include a data processing system (e.g., the data processing system 115) of a vehicle (e.g., the first electric vehicle 105) exchanging credentials with a second vehicle (e.g., the second electric vehicle 110) and establishing eligibility of the vehicle. The credentials can include identifiers, keys, digital signatures. The vehicles can further exchange identifiers such as model identifier, software version, operating mode. The operating mode can indicate that a user has allowed their vehicle to perform distributed processing. The operating mode can indicate that the user has prohibited their vehicle from performing distributed processing. Based on the credential, the vehicle can determine whether the second vehicle is eligible. The vehicle can compare the credential to a list of vehicles with approved credentials. The vehicle can analyze the identifiers to determine whether the second vehicle is eligible for distributed processing.

At ACT 720, the method 700 can include a data processing system (e.g., the data processing system 115) of a vehicle (e.g., the first electric vehicle 105) adding a second vehicle (e.g., the second electric vehicle 110) to a deny list. The deny list can be a list stored by the first electric vehicle 105. The deny list can include a list of vehicles that are not allowed to perform distributed processing. The deny list can include a list of vehicles that the vehicle is not allowed to perform distributed processing with. The second vehicle can be added to the deny list based on the exchange of credentials at ACT 715.

At ACT 725, the method 700 can include a data processing system (e.g., the data processing system 115) of a vehicle (e.g., the first electric vehicle 105) adding a second vehicle (e.g., the second electric vehicle 110) to an allow list. The allow list can be a list of vehicles that the vehicle can perform distributed processing with. The vehicles on the allow list can have the required software versions, user approval, or hardware to perform distributed processing. The second vehicle can be added to the allow list based on the exchange of credentials at ACT 715.

At ACT 730, the method can include a data processing system (e.g., the data processing system 115) of a vehicle (e.g., the first electric vehicle 105) exchanging messages. The vehicle can transmit a message with the vehicles on the allow list updated at ACT 725. The vehicles on the allow list can transmit messages to the vehicle. The message can be generated by a message distributor (e.g., the message distributor 120). The messages can indicate the speed of each vehicle on the allow list, the direction of travel of each vehicle on the allow list, a location of each vehicle on the allow list, an amount of computational resources available for each vehicle on the allow list.

At ACT 735, the method can include a data processing system (e.g., the data processing system 115) of a vehicle (e.g., the first electric vehicle 105) performing an optimization algorithm. The vehicle can perform the optimization algorithm based on the data of the messages received at ACT 730. The optimization algorithm can select one vehicle of the vehicles on the allow list. The optimization algorithm can select a vehicle that meets one or more conditions. The optimization algorithm can generate a score for each vehicle. The optimal score can be based on a duration of a communication channel between the vehicle and each vehicle on the allow list.

At ACT 740, the method can include a data processing system (e.g., the data processing system 115) of a vehicle (e.g., the first electric vehicle 105) determining whether to select a second vehicle (e.g., the second electric vehicle 110). The second vehicle can be selected by the vehicle responsive to determining, based on the optimization algorithm performed at ACT 735, that the second vehicle is in an optimal path. The vehicle can select a second vehicle with an optimal score. The vehicle can select a second vehicle that is not associated with an optimal score. The vehicle can select a second vehicle with a score that meets a threshold. The vehicle can select the second vehicle based on a speed and direction that the selected vehicle and the vehicle are traveling. The speed and the direction of the selected vehicle and the vehicle can indicate a duration of a communication channel between the selected vehicle and the vehicle. The vehicle can perform the optimization algorithm to select a vehicle that is associated with a duration of a communication channel that meets a threshold. The threshold can be based on a length of time that it is predicted for the selected vehicle to execute a process for distributed processing.

At ACT 745, the method can include a data processing system (e.g., the data processing system 115) of a vehicle (e.g., the first electric vehicle 105) distributing a process. The vehicle can split an operation into a first process and a second process. The second process can be transmitted by the vehicle to a second vehicle (e.g., the second electric vehicle 110) to perform distributed processing. The vehicle can transmit the process via a radio communication circuit (e.g., the radio communication circuit 150). The vehicle can communicate the process via a peer-to-peer or inter-vehicle communication protocol. The vehicle can communicate the process via Sidelink. At ACT 750, the method can include a data processing system (e.g., the data processing system 115) of a vehicle (e.g., the first electric vehicle 105) not distributing the process to a particular vehicle. The vehicle may not distribute a process for distributed processing to one or multiple vehicles that do not meet the conditions for a duration of a communication channel between the vehicle and the one or multiple vehicles.

At Act 755, the method can include a data processing system (e.g., the data processing system 155) of a vehicle (e.g., the second electric vehicle 110). The vehicle can execute the process received. The vehicle can include a process executor (e.g., the process executor 195) that executes the process and generates a result. The result data can be transmitted by the vehicle back to the distributing vehicle (e.g., the first electric vehicle 105). The result data can be transmitted via a radio communication circuit (e.g., the radio communication circuit 205) of the vehicle to a radio communication circuit (e.g., the radio communication circuit 150) of the distributing vehicle. The result can be communicated via a peer-to-peer or inter-vehicle communication protocol, e.g., Sidelink.

Figure 8:
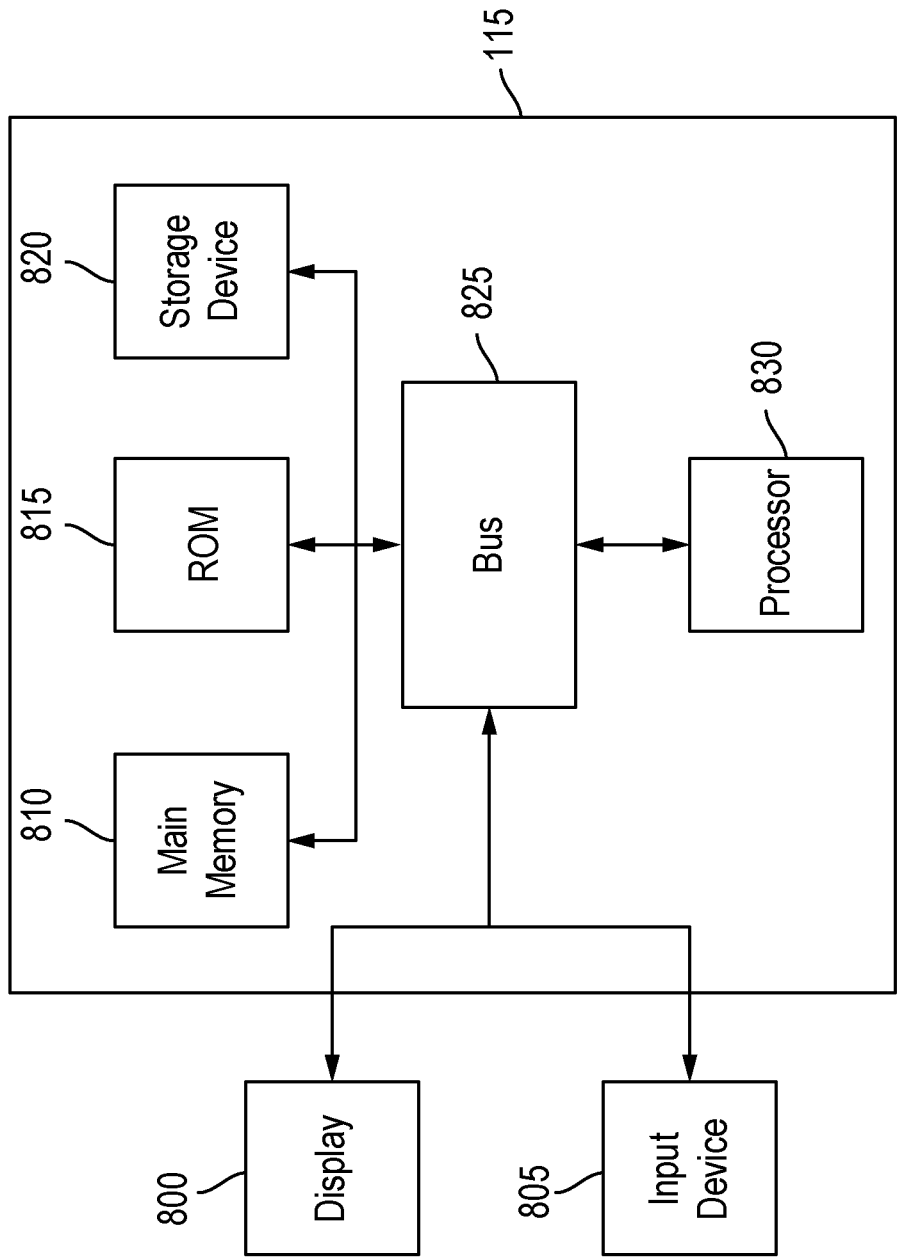
FIG. 8 is a block diagram depicting an architecture for a computer system that can be employed to implement elements of the systems and methods described and illustrated herein, including, for example, the system depicted in FIG. 1, and the methods depicted in FIGS. 5-7.

FIG. 8 depicts an example block diagram of the data processing system 115. The data processing system 115 can include or be used to implement a data processing system or its components. The data processing system 115 can include at least one bus 825 or other communication component for communicating information and at least one processor 830 or processing circuit coupled to the bus 825 for processing information. The data processing system 115 can include one or more processors 830 or processing circuits coupled to the bus 825 for processing information. The data processing system 115 can include at least one main memory 810, such as a random access memory (RAM) or other dynamic storage device, coupled to the bus 825 for storing information, and instructions to be executed by the processor 830. The main memory 810 can be used for storing information during execution of instructions by the processor 830. The data processing system 115 can further include at least one read only memory (ROM) 815 or other static storage device coupled to the bus 825 for storing static information and instructions for the processor 830. A storage device 820, such as a solid state device, magnetic disk or optical disk, can be coupled to the bus 825 to persistently store information and instructions.

The data processing system 115 can be coupled via the bus 825 to a display 800, such as a liquid crystal display, or active matrix display. The display 800 can display information to a user such as a driver of the first electric vehicle 105 or other end user. An input device 805, such as a keyboard or voice interface can be coupled to the bus 825 for communicating information and commands to the processor 830. The input device 805 can include a touch screen of the display 800. The input device 805 can include a cursor control, such as a mouse, a trackball, or cursor direction keys, for communicating direction information and command selections to the processor 830 and for controlling cursor movement on the display 800.

The processes, systems and methods described herein can be implemented by the data processing system 115 in response to the processor 830 executing an arrangement of instructions contained in main memory 810. Such instructions can be read into main memory 810 from another computer-readable medium, such as the storage device 820. Execution of the arrangement of instructions contained in main memory 810 causes the data processing system 115 to perform the illustrative processes described herein. One or more processors in a multi-processing arrangement can be employed to execute the instructions contained in main memory 810. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the vehicles described herein can be various types of vehicles, e.g., internal combustion engine vehicles, hybrid vehicles, or electric vehicles. For example, the vehicles described herein and shown in the figures can be the same type of vehicle or different types of vehicles. For example, the systems and methods described herein can be implemented on internal combustion engine vehicles, hybrid vehicles, electric vehicles or various combinations thereof. For example, the operations performed by the first vehicle and the second vehicle described herein can be interchangeable, e.g., the second vehicle could perform the operations described with reference to the first vehicle and the first vehicle could perform the operations described with reference to the second vehicle. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system of a vehicle, comprising:
a data processing system comprising one or more processors, coupled to memory, to:
identify an operation executable by the data processing system comprising a first process and a second process;
calculate a duration of a communication channel between the vehicle and a second vehicle based at least in part on a first length of time that the vehicle and the second vehicle are within a communication range;
determine a threshold based at least in part on a second length of time for the second vehicle to perform the second process;
determine that the duration of the communication channel is greater than or equal to the threshold;
determine, responsive to the determination that the duration of the communication channel is greater than or equal to the threshold, to split the operation into the first process and the second process for distributed processing by the vehicle and the second vehicle; and
transmit, responsive to the determination to split the operation, a request to perform the second process to the second vehicle to cause the second vehicle to execute the second process.

2. The system of claim 1, comprising:
the data processing system to determine that the duration of the communication channel is greater than or equal to the threshold based at least in part on a speed and a direction of the second vehicle relative to the vehicle.

3. The system of claim 1, wherein the communication channel comprises a line-of-sight communication.

4. The system of claim 1, comprising the data processing system to:
transmit the request to perform the second process to the second vehicle via a radio module of the vehicle based on a vehicle to vehicle communication protocol.

5. The system of claim 1, comprising the data processing system to:
receive, via a radio module of the vehicle, a message from the second vehicle comprising an identifier of the second vehicle; and
determine, based on the identifier of the second vehicle, to split the operation into the first process and the second process for distributed processing by the vehicle and the second vehicle.

6. The system of claim 1, comprising the data processing system to:
perform communication with a radio area network via a radio module of the vehicle to cause a remote computing system to perform the operation;
detect a communication issue with the radio area network based on the communication; and
determine to split the operation into the first process and the second process for distributed processing by the vehicle and the second vehicle responsive to detecting the communication issue.

7. The system of claim 1, comprising the data processing system to:
receive, via a radio module of the vehicle, a message including an indication of eligibility of the second vehicle for performing the second process; and
split the operation into the first process and the second process for distributed processing by the vehicle and the second vehicle based on the indication of eligibility of the second vehicle for performing the second process.

8. The system of claim 1, comprising the data processing system to:
receive, via a radio module of the vehicle, a message from the second vehicle comprising a speed of the second vehicle and a driving direction of the second vehicle; and
determine, based on the speed of the second vehicle and the driving direction of the second vehicle, to split the operation into the first process and the second process for distributed processing by the vehicle and the second vehicle.

9. The system of claim 1, comprising the data processing system to:
receive, via a radio module of the vehicle, a message from the second vehicle comprising available computational resources of the second vehicle; and
determine, based on the available computational resources of the second vehicle, to split the operation into the first process and the second process for distributed processing by the vehicle and the second vehicle.

10. The system of claim 1, comprising:
the operation including generation of a first spatial map of the vehicle; and
the data processing system configured to:
receive, via a radio module of the vehicle, a message from the second vehicle comprising a second spatial map generated by the second vehicle, wherein at least a portion of the first spatial map and the second spatial map overlap; and
determine, based on the second spatial map, to split the operation into the first process and the second process for distributed processing by the vehicle and the second vehicle.

11. The system of claim 1, comprising the data processing system to:
receive, via a radio module of the vehicle, a message from the second vehicle, wherein the message further includes at least one of:
a location of the second vehicle;
an identifier of the second vehicle;
a timestamp associated with the message; and
a description of computational hardware of the second vehicle; and
determine, based on at least one of the location, the identifier, the timestamp, and the description of the computational hardware, to split the operation into the first process and the second process for distributed processing by the vehicle and the second vehicle.

12. The system of claim 1, comprising the data processing system to:
receive, via a radio of the vehicle, a response from the second vehicle, the response including a process result of the second process; and
generate a result based on the process result of the second process and another process result of the first process.

13. The system of claim 1, comprising the data processing system to:
determine that the second vehicle encountered an error in completing the second process or returning a result of the second process; and
perform the second process in response to determining that the second vehicle encountered the error in completing the second process or returning the result of the second process.

14. The system of claim 1, comprising the data processing system to:
determine the first length of time that the vehicle and the second vehicle will be in a line of sight communication;
perform a comparison of the first length of time to the threshold; and
determine, based on the comparison of the first length of time to the threshold, to split the operation into the first process and the second process for distributed processing by the vehicle and the second vehicle.

15. The system of claim 1, comprising the data processing system to:
set the threshold to a value based at least in part on the second length of time for the second vehicle to perform the operation.

16. The system of claim 1, comprising:
the operation configured to execute to generate a first data set, wherein:
the second vehicle executes a second operation to generate a second data set;
at least a portion of the first data set and the second data set overlap; and
at least one of the first process or the second process generate the portion of the first data set and the second data set that overlap.

17. A method, comprising:
identifying, by a data processing system including one or more processors coupled to memory, an operation executable by the data processing system comprising a first process and a second process;
calculating, by the data processing system, a duration of a communication channel between a vehicle and a second vehicle based at least in part on a first length of time that the vehicle and the second vehicle are within a communication range;
determine a threshold based at least in part on a second length of time for the second vehicle to perform the second process;
determining, by the data processing system, that the duration of the communication channel is greater than or equal to the threshold;
determining, by the data processing system, responsive to determining that the duration of the communication channel is greater than or equal to the threshold, to split the operation into the first process and the second process for distributed processing by the vehicle and the second vehicle; and
transmitting, by the data processing system, responsive to the determination to split the operation, a request to perform the second process to the second vehicle to cause the second vehicle to execute the second process.

18. The method of claim 17, comprising:
determining, by the data processing system, the first length of time that the vehicle and the second vehicle are in a line of sight communication;
determining, by the data processing system, the threshold by determining, based on the second process, the second length of time required for the second vehicle to perform the second process;
performing, by the data processing system, a comparison of the first length of time to the threshold; and
determining, by the data processing system, based on the comparison of the first length of time to the threshold, to split the operation into the first process and the second process for distributed processing by the vehicle and the second vehicle.

19. A system of a vehicle, comprising:
a data processing system comprising one or more processors, coupled to memory, to:
generate a message comprising data indicating a duration of a communication channel between the vehicle and a second vehicle, the duration based at least in part on a first length of time that the vehicle and the second vehicle are within a communication range;
transmit the message to the second vehicle;
receive a request from the second vehicle to perform a process, the second vehicle compares the duration to threshold to determine to send the request to the vehicle, the threshold based at least in part on a second length of time for the vehicle to perform the process;
generate result data by performing the process; and
transmit the result data to the second vehicle.

20. The system of claim 19, comprising the message including:
a location of the second vehicle;
an identifier of the second vehicle;
a timestamp associated with the message; and
a description of computational hardware of the second vehicle.

* * * * *